United States Patent
Mori et al.

(10) Patent No.: US 11,947,836 B2
(45) Date of Patent: Apr. 2, 2024

(54) MEMORY SYSTEM AND METHOD

(71) Applicant: Kioxia Corporation, Tokyo (JP)

(72) Inventors: Haruka Mori, Kawasaki Kanagawa (JP); Akihiro Nagatani, Yokohama Kanagawa (JP)

(73) Assignee: Kioxia Corporation, Tokyo (JP)

(*) Notice: Subject to any disclaimer, the term of this patent is extended or adjusted under 35 U.S.C. 154(b) by 35 days.

(21) Appl. No.: 17/939,745

(22) Filed: Sep. 7, 2022

(65) Prior Publication Data
US 2023/0297275 A1    Sep. 21, 2023

(30) Foreign Application Priority Data

Mar. 17, 2022    (JP) .................. 2022-042726

(51) Int. Cl.
*G06F 12/00*    (2006.01)
*G06F 3/06*    (2006.01)

(52) U.S. Cl.
CPC .......... *G06F 3/0658* (2013.01); *G06F 3/0644* (2013.01); *G06F 3/0656* (2013.01); *G06F 3/0604* (2013.01); *G06F 3/0683* (2013.01)

(58) Field of Classification Search
CPC .... G06F 3/0658; G06F 3/0644; G06F 3/0656; G06F 3/0604; G06F 3/0683; G06F 11/3034; G06F 11/3037; G06F 11/3409; G06F 2201/88; G06F 3/0619; G06F 3/064; G06F 3/0659; G06F 3/0679; G06F 3/0688; G06F 3/061
See application file for complete search history.

(56) References Cited

U.S. PATENT DOCUMENTS

| | | | |
|---|---|---|---|
| 10,656,842 B2 | 5/2020 | Mathur et al. | |
| 10,732,898 B2 | 8/2020 | Shi et al. | |
| 2017/0269875 A1 | 9/2017 | Kim et al. | |
| 2020/0218655 A1 | 7/2020 | Kanno | |
| 2021/0224205 A1* | 7/2021 | Dalmatov | G06F 11/3452 |

* cited by examiner

*Primary Examiner* — Arvind Talukdar
(74) *Attorney, Agent, or Firm* — Allen & Overy LLP

(57) ABSTRACT

A memory system includes a memory controller and a first memory. The memory controller writes a plurality of first data segments of user data and metadata to a plurality of first segment regions of the first memory according to a first order. In response to a read request from a host, the memory controller individually identifies a plurality of second segment regions to which a plurality of second data segments corresponding to requested user data has been written. The memory controller determines whether or not to perform a prefetch operation according to a second order and a third order. The second order is an order of reading the second data segments from the second segment regions. The third order corresponds to the first order excluding the order of write destinations of the metadata.

20 Claims, 18 Drawing Sheets

| LOGICAL BLOCK NUMBER | PAGE NUMBER | IN-LOGICAL BLOCK LOCATION INFORMATION | CLUSTER NUMBER |
|---|---|---|---|

FIG.8

US 11,947,836 B2

MEMORY SYSTEM AND METHOD

CROSS-REFERENCE TO RELATED APPLICATIONS

This application is based upon and claims the benefit of priority from Japanese Patent Application No. 2022-042726, filed on Mar. 17, 2022; the entire contents of which are incorporated herein by reference.

FIELD

Embodiments described herein relate generally to a memory system and a method.

BACKGROUND

A memory system including a nonvolatile memory has been known. Examples of the nonvolatile memory include a NAND flash memory.

BRIEF DESCRIPTION OF THE DRAWINGS

FIG. 8 is a schematic diagram illustrating an exemplary configuration of write management information according to the first embodiment;

DETAILED DESCRIPTION

According to one embodiment, in general, a memory system is to be connected to a host. The memory system includes a first memory and a memory controller. The first memory includes a nonvolatile storage region including a plurality of first segment regions. The memory controller is configured to write a plurality of first data segments of user data and metadata to the plurality of first segment regions in accordance with a first setting. The first setting is a setting that defines a first order and write destinations of the user data and the metadata in the plurality of first segment regions. The first order is an order of selection of the plurality of first segment regions as a write destination. In response to a read request from the host, the memory controller is configured to individually identify a plurality of second segment regions to which a plurality of second data segments has been written, from among the plurality of first segment regions. The plurality of second data segments corresponds to user data requested by the read request among the plurality of first data segments. The memory controller is configured to determine whether or not to perform a prefetch operation in a read operation to the plurality of second segment regions according to a second order and a third order. The second order is an order of reading the plurality of second data segments from the plurality of second segment regions. The third order corresponds to the first order excluding the order of write destinations of the metadata.

Embodiments of a memory system and a method will be described in detail below with reference to the accompanying drawings. These embodiments are presented for illustrative purpose only and are not intended to limit the scope of the present invention.

First Embodiment

Figure 1:
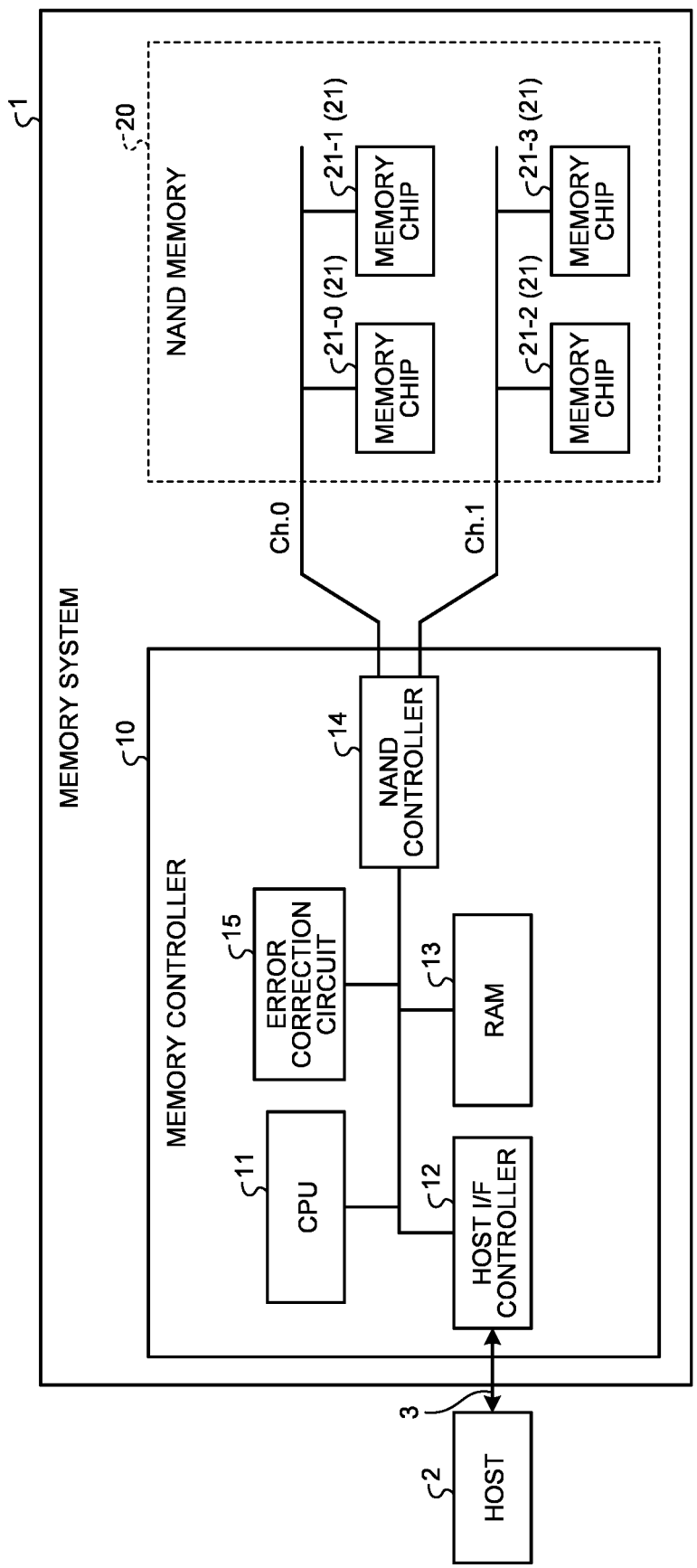
FIG. 1 is a schematic diagram illustrating an exemplary hardware configuration of a memory system according to a first embodiment.

FIG. 1 is a schematic diagram illustrating an exemplary hardware configuration of a memory system according to a first embodiment.

A memory system 1 is connectable to a host 2. The connection standard between the memory system 1 and the host 2 is not limited to a particular standard. The host 2 is, for example, a personal computer, a personal digital assistant, or a server.

To access the memory system 1, the host 2 transmits an access request to the memory system 1. Examples of the access request include a write request and a read request. The access request is accompanied by a logical address and size information. The logical address refers to information representing a location in a logical address space provided by the memory system 1 to the host 2. Specifically, in accessing the memory system 1, the host 2 designates a location to be accessed using the logical address. Examples of the logical address include a logical block address (LBA). The size information contained in the access request represents a continuous range starting from the location designated by the logical address in the logical address space. Thus, the host 2 designates an access range in the logical address space by using the logical address and the size information in the access request.

The host 2 transmits data to be written to the memory system 1. Such data transmitted from the host 2 to the memory system 1 is referred to as user data.

The memory system 1 includes a memory controller 10 and a nonvolatile memory 20.

The nonvolatile memory 20 functions as a storage. Examples of the nonvolatile memory 20 include a NAND flash memory. The nonvolatile memory 20 will be hereinafter referred to as a NAND memory 20. The NAND memory 20 is an example of a first memory. Any type of memory can be adopted for the first memory.

The memory controller 10 performs control of the memory system 1. This control includes a control related to data transfer between the host 2 and the NAND memory 20. The memory controller 10 can be configured as, for example, a system-on-a-chip (SoC). The memory controller 10 includes elements for controlling the memory system 1, i.e., a central processing unit (CPU) 11, a host interface (I/F) controller 12, a random access memory (RAM) 13, a NAND controller 14, and an error correction circuit 15.

The CPU 11 performs control of the memory controller 10 by a firmware program. The firmware program is pre-stored in, for example, the NAND memory 20, and is loaded from the NAND memory 20 onto the RAM 13 at the time of startup of the memory system 1. The CPU 11 executes the firmware program in the RAM 13. The storage location of the firmware program is not limited to the NAND memory 20. The functions of the respective elements of the memory controller 10 may be implemented by dedicated hardware, the CPU 11 executing the firmware program, or a combination thereof.

The RAM 13 is a volatile memory capable of high-speed operation. Memory constituting the RAM 13 is not limited to a particular type. For example, the RAM 13 may include a dynamic random access memory (DRAM), a static random access memory (SRAM), or a combination thereof. The memory constituting the RAM 13 may be partially or entirely configured as a chip separate from the memory controller 10.

The host I/F controller 12 serves to control a communication interface between the memory system 1 and the host 2. The NAND controller 14 accesses the NAND memory 20 under the control of the CPU 11. The CPU 11 controls the host I/F controller 12 and the NAND controller 14 to transfer data between the host 2 and the NAND memory 20.

The error correction circuit 15 serves to encode data to be written to the NAND memory 20 for error correction. The error correction circuit 15 corrects error in encoded data output from the NAND memory 20 by decoding the encoded data. The error correction circuit 15 can implement data coding by any encoding algorithm. As an example, the error correction circuit 15 adopts reed-solomon (RS) coding. The error correction circuit 15 may include an encoding circuit and a decoding circuit.

The NAND memory 20 includes one or more memory chips 21. The one or more memory chips 21 are connected to the memory controller 10 via one or more channels. In the example in FIG. 1, the NAND memory 20 includes memory chips 21-0, 21-1, 21-2, and 21-3. The memory chips 21-0 and 21-1 are connected to the memory controller 10 via a channel ch.0. The memory chips 21-2 and 21-3 are connected to the memory controller 10 via a channel ch.1. The two memory chips 21-0 and 21-1 connected to the channel ch.0 and the two memory chips 21-2 and 21-3 connected to the channel ch.1 can operate independently of each other. The number of the memory chips 21 constituting the NAND memory 20 and the number of channels connecting the NAND memory 20 and the memory controller 10 are not limited to this example.

Figure 2:
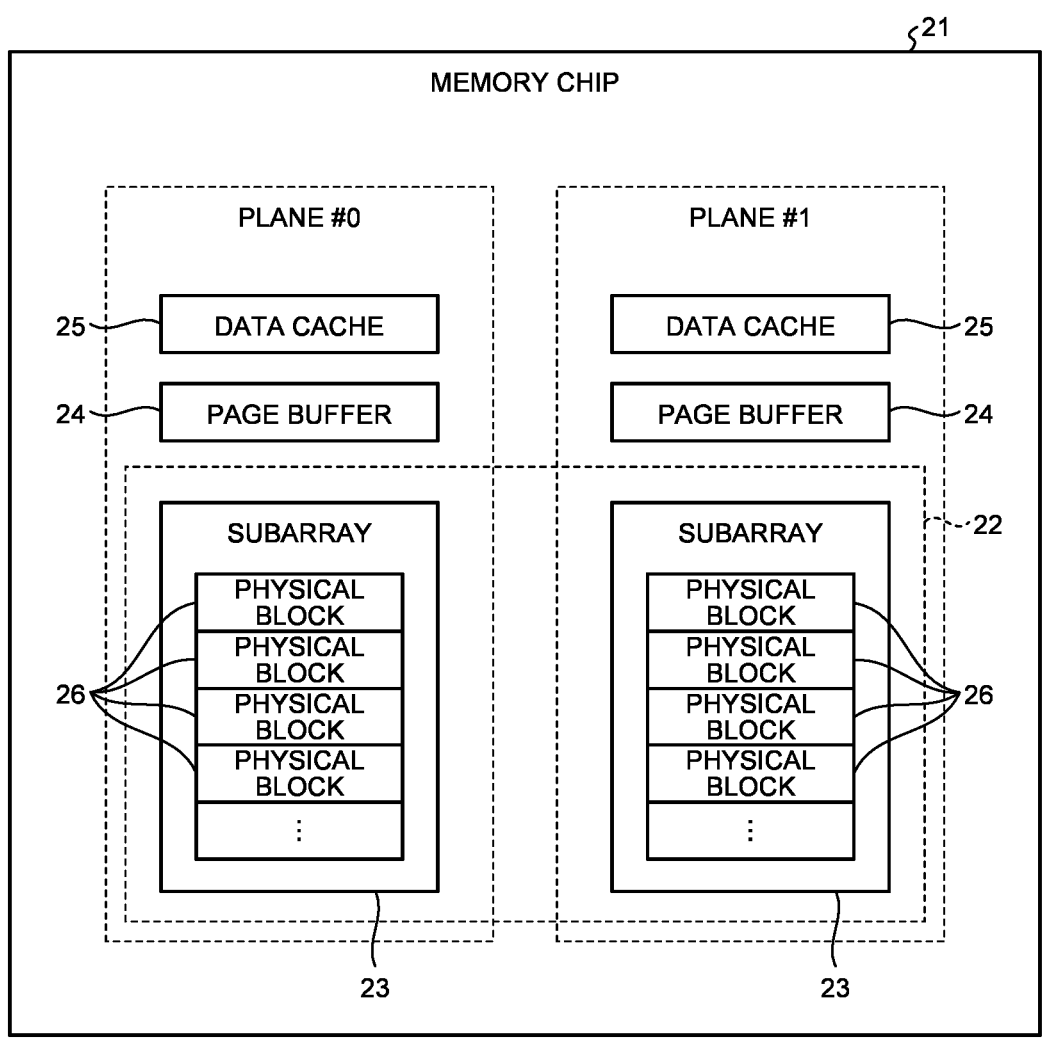
FIG. 2 is a schematic diagram illustrating an exemplary configuration of a memory chip according to the first embodiment.

FIG. 2 is a schematic diagram illustrating an exemplary configuration of one memory chip 21 according to the first embodiment.

According to the example in FIG. 2, the memory chip 21 includes a memory cell array 22, two page buffers 24, and two data caches 25. The memory cell array 22 is divided into two subarrays 23. The page buffers 24 and the data caches 25 each include, for example, an SRAM. The page buffers 24 and the data caches 25 may each include a flip-flop. Accesses to the memory cell array 22 include writing (also referred to as programming), reading, and erasing. One of the subarrays 23, one of the two page buffers 24, and one of the two data caches 25 constitute one plane and the others of them constitute another plane. Thus, the memory chip 21 includes two planes. The two planes can operate independently of each other. The planes in each memory chip 21 are individually identified by a plane number. The number of planes in one memory chip 21 is not limited to two. One memory chip 21 may not be divided into a plurality of planes.

In this disclosure, a series of operations by the memory chip 21 from receiving input data from the memory controller 10 to writing the input data to the memory cell array 22 is referred to as a write operation. A series of operations by the memory chip 21 from reading data from the memory cell array 22 to outputting the data to the memory controller 10 is referred to as a read operation.

In the write operation, the memory chip 21 receives input data from the memory controller 10 in the data cache 25. The data input operation from the memory controller 10 to the data cache 25 is also referred to as a data-in operation. After the data-in operation, the memory chip 21 transfers the data from the data cache 25 to the page buffer 24 and writes the data from the page buffer 24 to the memory cell array 22 after completion of the transfer. The data write operation from the page buffer 24 to the memory cell array 22 is also referred to as a program operation.

In the read operation, the memory chip 21 first transfers data to be read from the memory cell array 22 to the page buffer 24. The data transfer operation from the memory cell array 22 to the page buffer 24 is also referred to as a sense operation. By the sense operation, the memory chip 21 transfers the data to be read from the page buffer 24 to the data cache 25. The memory chip 21 outputs the data from the data cache 25 to the memory controller 10. The data output operation from the data cache 25 to the memory controller 10 is also referred to as a data-out operation.

Each subarray 23 includes a plurality of physical blocks 26. Data written in one physical block 26 is erased collectively.

The page buffer 24 is an example of a first buffer. The data cache 25 is an example of a second buffer.

Figure 3:
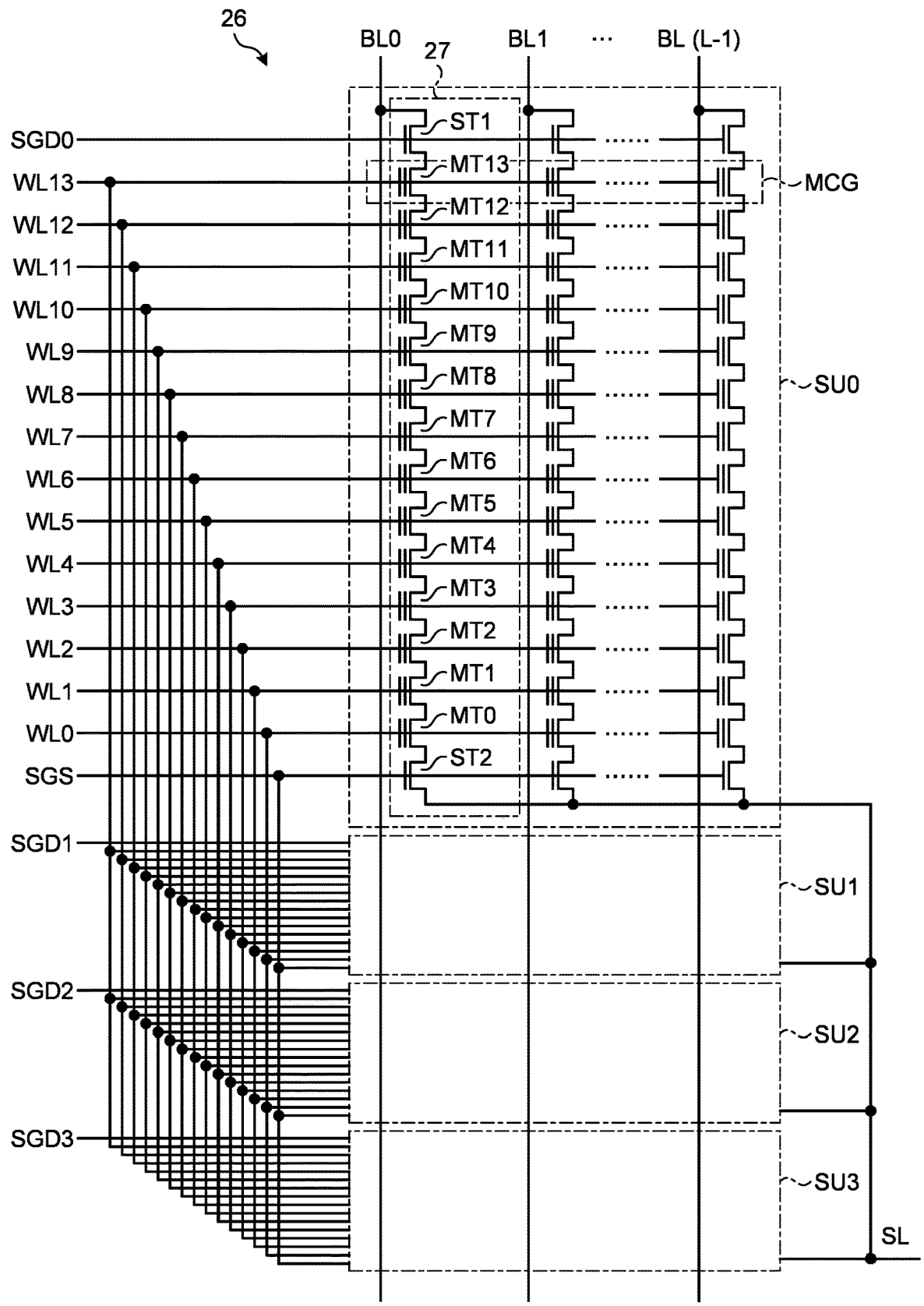
FIG. 3 illustrates a circuit configuration of a physical block according to the first embodiment.

FIG. 3 illustrates a circuit configuration of one physical block 26 according to the first embodiment. Each of the physical blocks 26 has the same configuration.

The physical block 26 includes, for example, four string units SU0 to SU3. Each string unit SU includes a plurality of NAND strings 27.

Each of the NAND strings 27 includes, for example, 14 memory cell transistors MT (MT0 to MT13) and selection transistors ST1 and ST2. Each memory cell transistor MT includes a control gate and a charge storage layer, and stores data in a nonvolatile manner. The 14 memory cell transistors MT (MT0 to MT13) are connected in series between a source of the selection transistor ST1 and a drain of the selection transistor ST2. The memory cell transistor MT may be of a metal oxide nitride oxide silicon (MONOS) type including an insulating film as the charge storage layer, or of a floating gate (FG) type including a conductive film as the charge storage layer. The number of memory cell transistors MT in one NAND string 27 is not limited to 14.

Gates of the selection transistors ST1 in the string units SU0 to SU3 are connected to selection gate lines SGD0 to SGD3, respectively. Gates of the selection transistors ST2 in the string units SU0 to SU3 are commonly connected to, for example, a selection gate line SGS. The gates of the selection transistors ST2 in the string units SU0 to SU3 may be connected to different selection gate lines SGS0 to SGS3 (not illustrated), respectively. Control gates of the memory cell transistors MT0 to MT13 in the same physical block 26 are commonly connected to word lines WL0 to WL13, respectively.

Drains of the selection transistors ST1 in the NAND strings 27 in the string units SU are connected to different bit lines BL (BL0 to BL(L−1) where L is a natural number of two or more). Each bit line BL commonly connects one NAND string 27 in the string units SU among the physical blocks 26. Sources of the selection transistors ST2 are commonly connected to a source line SL.

Thus, the string unit SU is a set of NAND strings 27 connected to different bit lines BL and the same selection gate line SGD. The physical block 26 is a set of string units SU connected to the same word line WL. The memory cell array 22 is a set of physical blocks 26 connected to the same bit line BL.

As described above, data is erased from the memory cell array 22 in units of physical blocks 26.

In the memory cell array 22, the memory cell transistors MT connected to the same word line WL in one string unit SU are collectively subjected to a write operation (i.e., program operation) and a read operation (i.e., sense operation). Hereinafter, a group of memory cell transistors MT collectively selected in the program operation and the sense operation will be referred to as a memory cell group MCG. In each of the memory cell transistors MT included in one memory cell group MCG, an aggregate of 1-bit storage regions to be written or read will be referred to as a page.

Each memory cell transistor MT may be configured to store multiple-bit data. As for the memory cells MT each of which can store n-bit (n 2) data, for example, the storage capacity per word line (per memory cell group MCG) is equal to a size of n-pages. A method of storing 3-bit data per memory cell transistor MT will be explained as an example. According to this method, each word line can store 3-page data.

Figure 4:
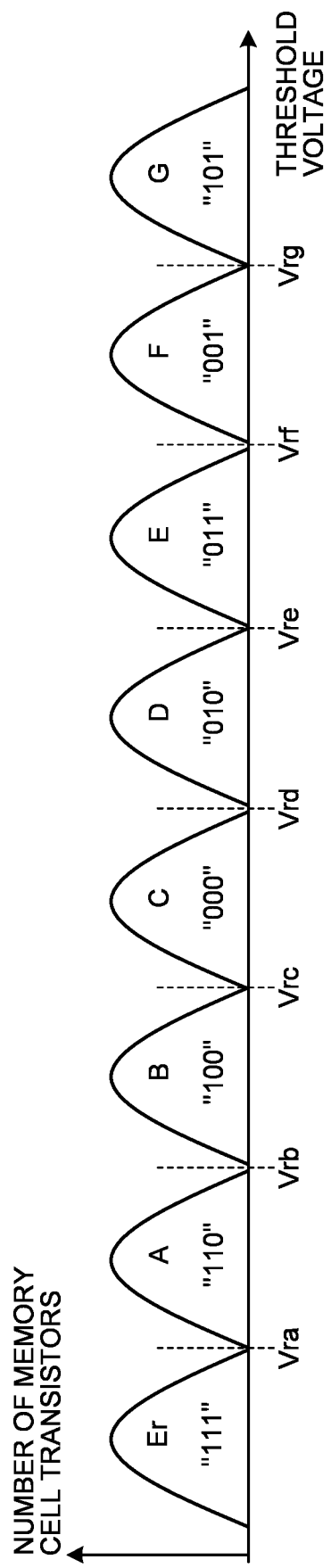
FIG. 4 illustrates exemplary data coding and threshold voltage distribution according to the first embodiment.

FIG. 4 illustrates exemplary data coding and threshold voltage distribution according to the first embodiment. The horizontal axis represents the threshold voltages of the memory cell transistors MT. FIG. 4 depicts eight lobes representing threshold voltage distributions. The eight threshold voltage distributions are threshold voltage regions and also referred to as states. Each of the eight states correspond to a 3-bit data value. In this example of FIG. 4, Er state corresponds to a data value "111". A-state corresponds to a data value "110". B-state corresponds to a data value "100". C-state corresponds to a data value "000". D-state corresponds to a data value "010". E-state corresponds to a data value "011". F-state corresponds to a data value "001". G-state corresponds to a data value "101". The first digit of each data value is defined as a most significant bit (MSB). The last digit of each data value is defined as a least significant bit (LSB). The correspondence between states and data values is not limited to this example.

The threshold voltage of each memory cell transistor MT is controlled to be in any of the eight states. The threshold voltage of each memory cell transistor MT is set in the Er state by an erase operation, and is set in any of the A to G states by a program operation in accordance with a data value.

In the sense operation, the threshold voltage of each memory cell transistor MT is compared with some determination voltages to identify the state to which the threshold voltage belongs. The data value corresponding to the identified state is then read. A combination of Vra, Vrb, Vrc, Vrd, Vre, Vrf, and Vrg in FIG. 4 is an example of a determination voltage.

Among 3-page storage regions of one word line WL (memory cell group MCG), a set of storage regions in which LSB data values are stored is referred to as a lower page. A set of storage regions in which MSB data values are stored is referred to as an upper page. A set of storage regions in which data values between LSB and MSB are stored is referred to as a middle page. The classification of a lower page, a middle page, and an upper page is referred to as a page type.

Data coding applicable to the first embodiment is not limited to the above-described example. The data size stored in each memory cell transistor MT is not limited to three bits.

Each page includes a plurality of clusters. In the logical address space, regions of a predetermined size (referred to as unit regions) are individually assigned logical addresses. The clusters are storage regions in the NAND memory 20 corresponding to the unit regions of the logical address space. The unit regions and the clusters may have the same size or different sizes from each other. Data segments of a predetermined size are subject to the RS encoding performed by the error correction circuit 15 and are written to each cluster. Data unit stored in one cluster will be hereinafter referred to as a data segment. The cluster is an example of a first segment region.

The memory controller 10 manages the locations of the clusters included in the NAND memory 20 using physical addresses. An exemplary configuration of the physical address will be described later.

The memory controller 10 groups two or more physical blocks 26 into one, and handles the two or more physical block groups 26 as one logical block.

Figure 5:
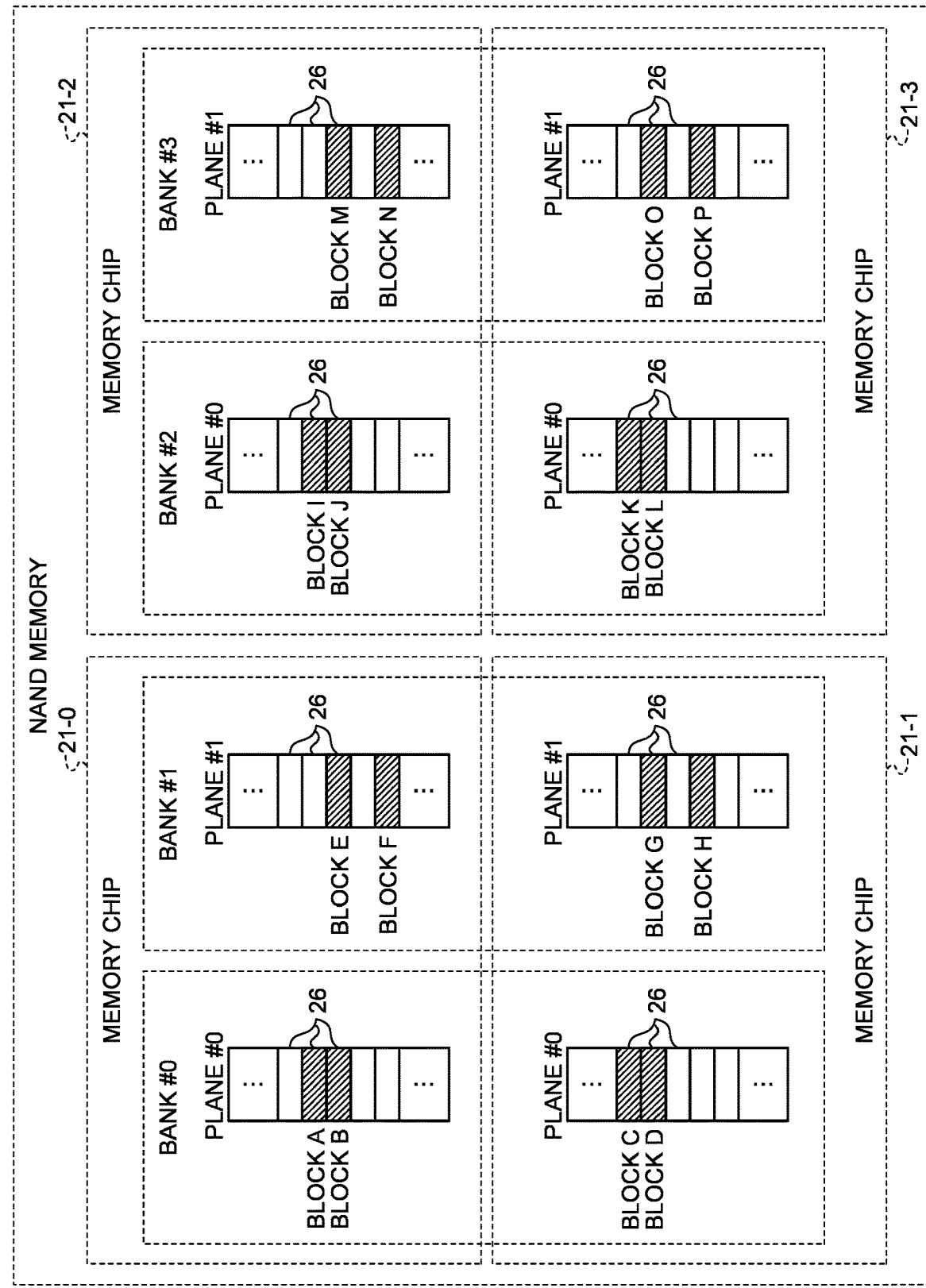
FIG. 5 is a schematic diagram illustrating an exemplary method of forming a logical block according to the first embodiment.

FIG. 5 is a schematic diagram illustrating an exemplary method of forming a logical block according to the first embodiment. In FIG. 5 the physical blocks 26 indicated by hatching constitute one logical block.

Specifically, blocks A, B, C, D, E, F, G, H, I, J, K, L, M, N, O, and P constitute one logical block. The blocks A and B are selected from the subarray 23 in the plane #0 of the memory chip 21-0. The blocks C and D are selected from the subarray 23 in the plane #0 of the memory chip 21-1. The blocks E and F are selected from the subarray 23 in the plane #1 of the memory chip 21-0. The blocks G and H are selected from the subarray 23 in the plane #1 of the memory chip 21-1. The blocks I and J are selected from the subarray 23 in the plane #0 of the memory chip 21-2. The blocks K and L are selected from the subarray 23 in the plane #0 of the memory chip 21-3. The blocks M and N are selected from the subarray 23 in the plane #1 of the memory chip 21-2. The blocks O and P are selected from the subarray 23 in the plane #1 of the memory chip 21-3.

The plane #0 of the memory chip 21-0 and the plane #0 of the memory chip 21-1 form a bank #0. The plane #1 of the memory chip 21-0 and the plane #1 of the memory chip 21-1 form a bank #1. The plane #0 of the memory chip 21-2 and the plane #0 of the memory chip 21-3 form a bank #2. The plane #1 of the memory chip 21-2 and the plane #1 of the memory chip 21-3 form a bank #3.

In each memory chip 21, the plane #0 and the plane #1 can operate independently of each other. The two memory chips 21-0 and 21-1 connected to the channel ch.0 and the two memory chips 21-2 and 21-3 connected to the channel ch.1 can operate independently of each other. The four banks #0 to #3 can operate independently of each other accordingly. In other words, the four banks #0 to #3 are operable in parallel.

In the example in FIG. 5, the memory controller 10 aggregates four physical blocks 26 from each of the four banks to form one logical block including 16 physical blocks 26 in total. The memory controller 10 sequentially forms logical blocks by such a method.

The bank configuration and the method of forming logical blocks in FIG. 5 are merely exemplary. The banks can be freely set. The logical blocks can also be freely set.

As described above, the locations of the clusters are managed using physical addresses.

Figures 6, 7:
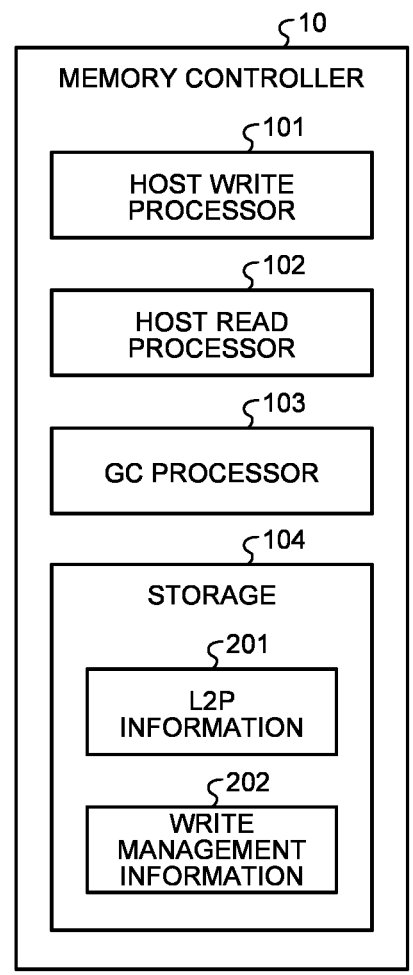
FIG. 6 is a schematic diagram illustrating an exemplary configuration of a physical address according to the first embodiment.
FIG. 7 is a schematic diagram illustrating an exemplary functional configuration of a memory controller according to the first embodiment.

FIG. 6 is a schematic diagram illustrating an exemplary configuration of the physical address according to the first embodiment.

In the example in FIG. 6, two or more digits including the most significant bit of a bit string of the physical address represent a logical block number serving as information for identifying a logical block.

Two or more digits subsequent to the digits indicating the logical block number represent a page number. The page number is a combination of a word line number and a string unit number.

Two or more digits subsequent to the digits indicating the page number represent in-logical block location information. The in-logical block location information is a combination of a channel number, a plane number, a location of the physical block 26 in the subarray 23, and a page type.

Two or more digits subsequent to the digits indicating the in-logical block location information represent a cluster number. The cluster number represents a relative location of a cluster with reference to the head of the page.

It is possible to identify, from the physical address as configured above, a memory chip of the memory chips 21, a plane, a word line WL, a string unit SU, a page type, and the location in the page, in which a cluster designated by the physical address is included. In other words, the physical address is configured to allow the identification of a cluster location in the NAND memory 20.

FIG. 7 is a schematic diagram illustrating an exemplary functional configuration of the memory controller 10 according to the first embodiment.

The memory controller 10 includes a host write processor 101, a host read processor 102, a garbage collection (GC) processor 103, and a storage 104.

For example, the CPU 11 functions as the host write processor 101, the host read processor 102, and the GC processor 103 by executing firmware. The RAM 13 functions as the storage 104. The host I/F controller 12 or the NAND controller 14 may include all or part of the functions of the host write processor 101, the host read processor 102, and the GC processor 103. The functions of the host write processor 101, the host read processor 102, and the GC processor 103 may be partially or entirely implemented by hardware circuitry such as a field-programmable gate array (FPGA) or an application specific integrated circuit (ASIC).

The storage 104 stores logical-to-physical address (L2P) information 201 and write management information 202.

The L2P information 201 is information for translating a logical address into a physical address. The L2P information 201 represents, for example, a table showing a correspondence between logical addresses and physical addresses in units of clusters. When updating the L2P information 201 in the storage 104, the memory controller 10 stores the updated portion to the NAND memory 20 in appropriate time. This is for the purpose of preventing the L2P information 201 from lost from the memory system 1 through a cycle of interruption and restart of power supply.

The memory controller 10 writes 3-page (i.e., lower page, middle page, and upper page) data to each physical block 26 constituting one logical block. The memory controller 10 switches a write destination to another on a page basis. The order in which write destinations are switched in one logical block is defined by the write management information 202.

Figure 8:
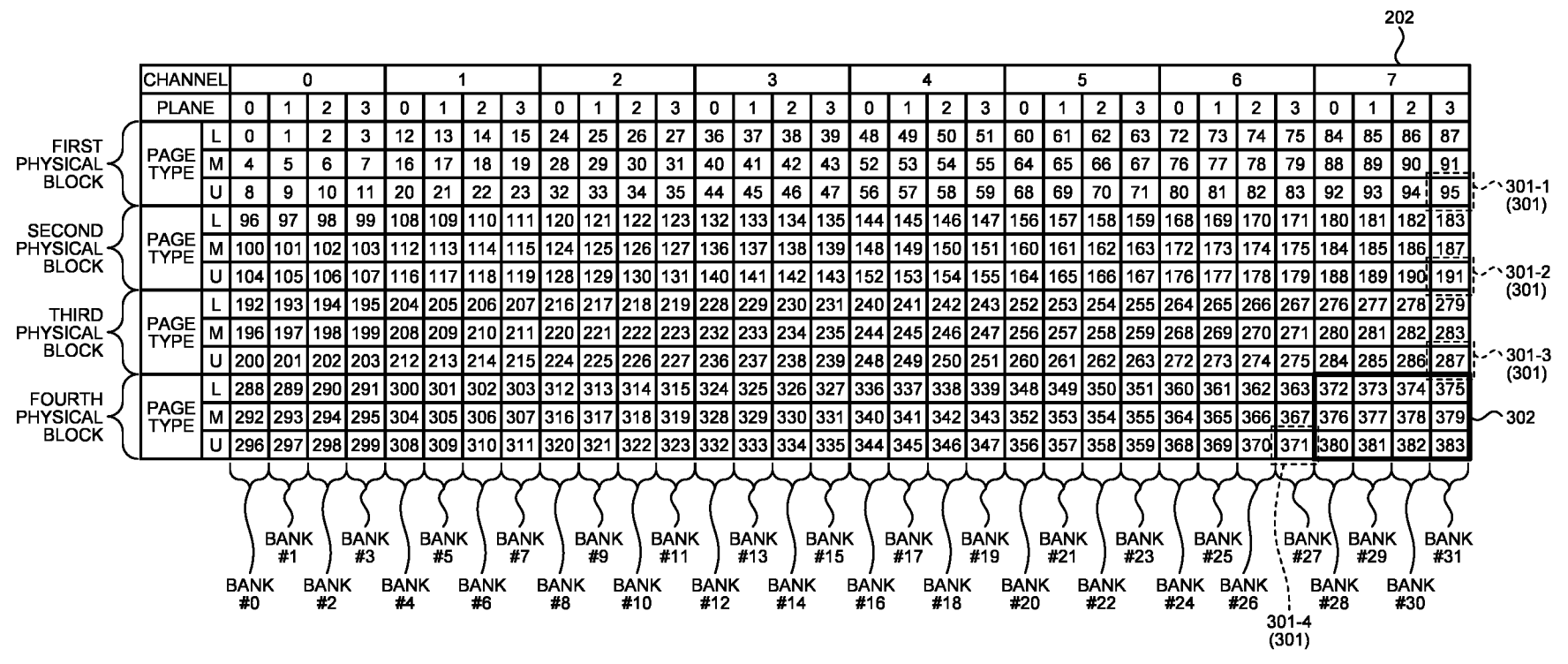

FIG. 8 is a schematic diagram illustrating an exemplary configuration of the write management information 202 according to the first embodiment.

The exemplary write management information in FIG. 8 bases on the following features. Specifically, the memory system 1 includes eight channels. Each channel connects one memory chip 21. Each memory chip 21 includes four planes. A combination of one channel and one plane forms a bank, so that there are 32 banks in total. Four physical blocks 26 selected from each bank, that is, a total of 128 physical blocks 26 constitute one logical block. The four physical blocks 26 selected from each of the banks are referred to as a first physical block, a second physical block, a third physical block, and a fourth physical block.

The write management information 202 contains the order in which user data is written to 384 pages (=3 pages×128 physical blocks) in the 128 physical blocks in one logical block. The writing order is set such that a bank to be written is switched to another on a page basis. The memory controller 10 writes data segments to the clusters of one page in cluster arrangement order from the head cluster to the last cluster. After completing the write operation to the one page, the memory controller 10 selects a next page to be written in accordance with the write management information 202.

Metadata is written to the NAND memory 20 in addition to the user data. The metadata includes, for example, a user data log or RS parity.

The user data log represents information containing one or more logical addresses individually associated with one or more data segments written in the NAND memory 20 (i.e., in the logical block corresponding to this user data log), which logical addresses are associated at the time of a write request from the host 2. Each time a predetermined amount of data segments are written to the NAND memory 20, the user data log is written to the NAND memory 20. The user data log represents information indicating the correspondence between logical addresses and physical addresses of individual data segments in a write operation to the NAND memory 20. The user data log is, for example, used in reconstruction of the L2P information 201.

The RS parity is generated from a frame of a 384-page (=3 pages×128 physical blocks) dataset included in the 128 physical blocks 26 constituting one logical block. Error correction using the RS parity has higher correction capability than error correction executed in units of data segments, however, it requires a longer time because of reading the frame. In view of this, the memory controller 10 is configured to read the frame including the RS parity to perform error correction using the RS parity after having failed in the error correction in units of data segments.

According to the example in FIG. 8, the upper page of the first physical block of the bank #31 is reserved for a user data log region 301-1. A user data log for user data written to the first physical block of each bank is written to the user data log region 301-1. In the 0th to 94th writing, data segments of user data are written to the first physical blocks of the banks #0 to #31, and, in the 95th writing, a user data log for all the written data segments thereto is written to the user data log region 301-1.

The upper page of the second physical block of the bank #31 is reserved for a user data log region 301-2. A user data log for user data written to the second physical block of each bank is written to the user data log region 301-2. In the 96th to 190th writing, data segments of the user data are written to the second physical blocks of the banks #0 to #31, and, in the 191st writing, a user data log for all the written data segments thereto is written to the user data log region 301-2.

The upper page of the third physical block of the bank #31 is reserved for a user data log region 301-3. A user data log for user data to be written to the third physical block of each bank is written to the user data log region 301-3. In the 192nd to 286th writing, data segments of the user data are written to the third physical blocks of the banks #0 to #31, and, in the 287th writing, a user data log for all the written data segments thereto is written to the user data log region 301-3.

The upper page of the fourth physical block of the bank #27 is reserved for a user data log region 301-4. A user data log for user data written to the fourth physical block of each bank is written to the user data log region 301-4. In the 288th to 370th writing, data segments of the user data are written to the fourth physical blocks of the banks #0 to #27, and, in the 371st writing, a user data log for all the written data segments thereto is written to the user data log region 301-4.

The fourth physical blocks of the banks #28 to #31 are reserved for an RS parity region 302 to which the RS parity is written. The RS parity, generated from all the data segments written to the logical blocks 0 to 371, is written to the RS parity region 302.

In this manner, the write management information 202 defines write destinations of user data and metadata and the order of selection of write destinations. The write management information 202 is an example of a first setting. The order of selecting write destinations defined by the write management information 202 is an example of a first order.

The write management information 202 is stored in the NAND memory 20 at a predetermined location, for example. The write management information 202 is loaded from the NAND memory 20 to the storage 104 at the time of startup of the memory system 1, for example. The respective functional elements of the memory controller 10 refer to the write management information 202 in the storage 104 as appropriate.

Return to FIG. 7. The host write processor 101 serves to write data to the NAND memory 20 in response to a receipt of a write request from the host 2. The host write processor 101 receives and divides the user data from the host 2 into one or more data segments, and acquires one or more logical addresses corresponding to the one or more data segments. In accordance with the write management information 202, the host write processor 101 determines one or more clusters as write destinations of the one or more data segments to write the one or more data segments to the one or more clusters as determined.

In writing the data segment divided from the user data to the NAND memory 20, the host write processor 101 updates the L2P information 201 so that the logical address of the data segment is associated with a physical address designating a cluster as a write destination of the data segment.

The host write processor 101 generates a user data log or RS parity each time a predetermined amount of data segments are written to the NAND memory 20. The host write processor 101 writes the generated user data log or the RS parity to the region 301 or 302 in the order as defined by the write management information 202.

The host read processor 102 serves to perform a read operation to the NAND memory 20 in response to a receipt of a read request from the host 2. The host read processor 102 acquires one or more logical addresses corresponding to one or more data segments as requested. The host read processor 102 identifies one or more clusters including one or more written data segments requested, based on the one or more logical addresses and the L2P information 201, to read the data segment or segments from the identified cluster or clusters.

In performing a read operation to the NAND memory 20, the host read processor 102 may instruct the memory chip 21 a type of the read operation to be performed. There are different types of read operation including a first read operation and a second read operation. As an example, the first read operation includes no prefetch operation while the second read operation includes a prefetch operation.

Access patterns from the host 2 to the memory system 1 include a sequential write pattern, a sequential read pattern, a random read pattern, and a random write pattern. The sequential write pattern is an access pattern that a plurality of data segments is written in order of logical addresses. The sequential read pattern is an access pattern that a plurality of data segments is read in order of logical addresses. The random write pattern is an access pattern that a plurality of data segments is written in order different from the order of logical addresses. The random read pattern is an access pattern that a plurality of data segments is read in order different from the order of logical addresses.

Typically, a plurality of data segments written in the sequential write pattern from a host to a memory system is often read in the sequential read pattern from the host.

As described above, upon receipt of a plurality of data segments from the host 2, the host write processor 101 sequentially writes the data segments to clusters as selected in the order defined by the write management information 202 (hereinafter, referred to as writing order). In a situation that the host 2 issues a read request in the sequential read pattern for a plurality of data segments which has been received in the sequential write pattern from the host, the data segments concerned are likely to be read from target clusters of the NAND memory 20 in the same order as the writing order.

In view of this, upon detecting the fact that the clusters to be read are being switched in the same order as the writing order, the host read processor 102 instructs the NAND memory 20 to perform a read operation including a prefetch operation, that is, the second read operation. Once the clusters to be read are switched in the writing order, it is expected that the clusters to be read will continue to be switched in the writing order in the foreseeable future. The host read processor 102 thus predicts user data to be likely read later based on the write management information 202 to prefetch the user data. Having correctly predicted, the host read processor 102 can use the prefetched user data, leading to improving read efficiency.

The host read processor 102 determines whether or not to perform a prefetch operation according to a result of comparison between the order in which clusters to be read are switched and the order defined by the write management information 202.

The host write processor 101 writes metadata and the user data received from the host 2 to the NAND memory 20. In an operation responsive to a read request, however, the host read processor 102 reads the user data but not the metadata from the NAND memory 20. In other words, the order in which clusters to be read are switched differs from the order defined by the write management information 202 in terms of whether or not accesses to the metadata are given the order.

In determining whether or not the order in which clusters to be read are switched is included in the order defined by the write management information 202, the host read processor 102 skips the order of writing the metadata to the regions 301 and 302 from the order defined by the write management information 202. Thereby, the host read processor 102 can accurately determine whether or not the data segments of the user data are being read in the same order as the order in which the data segments have been written to the NAND memory 20. Further, the host read processor 102 can determine whether or not to perform a prefetch operation based on a result of such an accurate determination as to whether the user data segments are being read in the same order as the writing order. Consequently, the host read processor 102 can improve the effect of the prefetch operation to enhance the read performance, that is, can improve the read performance.

Hereinafter, a read pattern including an order in which clusters to be read are switched in the same order as defined by the write management information 202 excluding the order of writing metadata to the regions 301 and 302 will be referred to as a sequential pattern. Further, a read pattern including an order in which clusters to be read are not switched in the same order as defined by the write management information 202 excluding the order of writing metadata to the regions 301 and 302 will be referred to as a non-sequential pattern.

The GC processor 103 serves to perform a garbage collection (also referred to as compaction).

While the physical block 26 stores a certain data segment (first data segment), when receiving a second data segment from the host 2 with a designation of a logical address of the same value as a logical address designated for the first data segment, the memory controller 10 regards the first data segment as invalid and the second data segment as valid. The memory controller 10 causes the host write processor 101 to write the second data segment to the NAND memory 20. Thus, the user data stored in the NAND memory 20 may include not only a valid data segment but also an invalid data segment.

The garbage collection refers to an operation of transcribing all valid data segments from one logical block to another logical block and invalidating all the data segments in the logical block being the transcript source. The transcript can also be referred to as copying. In the garbage collection, data segments regarded as invalid are not transcribed. In other words, the garbage collection is a process of relocating only valid data segments from one logical block to another logical block.

A logical block in which all data segments are invalidated, for example by a garbage collection, is handled as a free logical block. All the physical blocks 26 constituting the free logical block are collectively subjected to an erase operation. The erase operation places the logical block in a data writable state.

Figure 9:
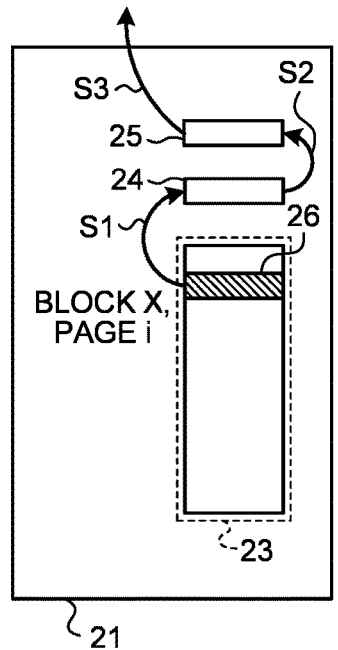
FIG. 9 is a schematic diagram illustrating a first read operation according to the first embodiment.

FIG. 9 is a schematic diagram illustrating the first read operation according to the first embodiment. A data segment is written in a certain page (referred to as page i) of a certain physical block 26 (referred to as block X) in a certain subarray 23, and this data segment is defined as a read target.

In the first read operation, the memory chip 21 transfers 1-page written data from the page i of the block X to the page buffer 24 by a sense operation (S1). The memory chip 21 transfers the 1-page written data from the page buffer 24 to the data cache 25 (S2). The memory chip 21 outputs a read-target data segment among the 1-page written data from the data cache 25 to the memory controller 10 (S3).

Figure 10:
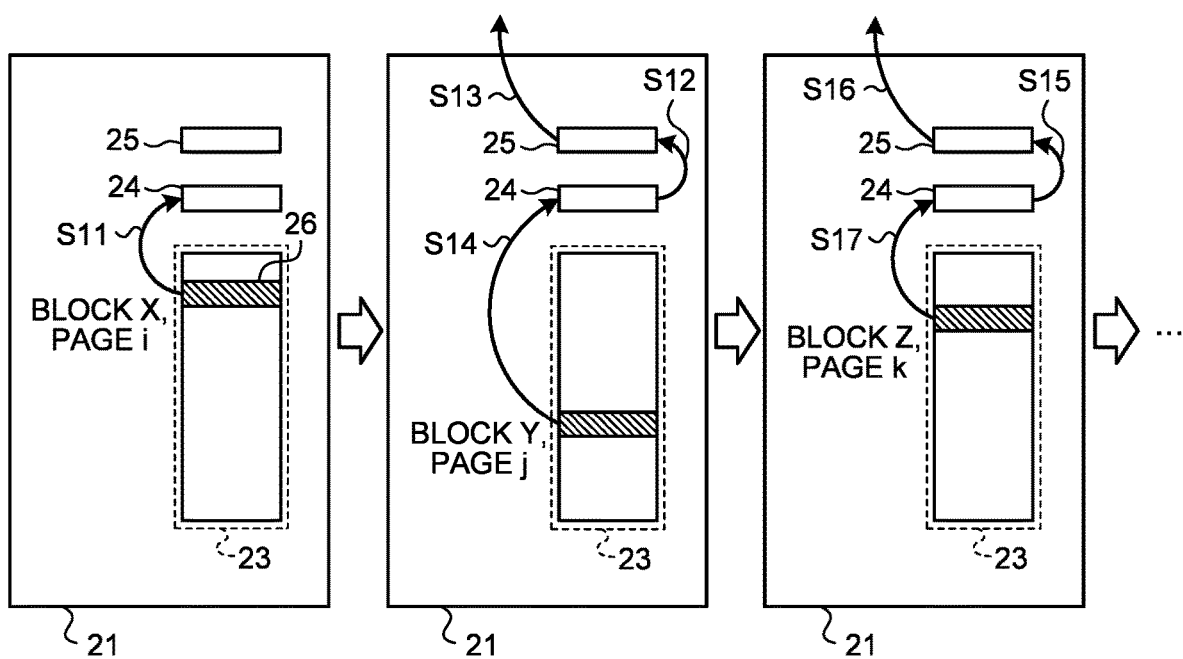
FIG. 10 is a schematic diagram illustrating a second read operation according to the first embodiment.

FIG. 10 is a schematic diagram illustrating the second read operation according to the first embodiment. A data segment is written in the page i of the block X in a certain subarray 23. Another data segment is written in a page j of another block Y in the subarray 23. Still another data segment is written in a page k of still another block Z in the subarray 23. These data segments are defined as read targets.

The memory chip 21 transfers 1-page written data from the page i of the block X to the page buffer 24 by a sense operation (S11). The memory chip 21 transfers the 1-page data from the page buffer 24 to the data cache 25 (S12). The memory chip 21 outputs a read-target data segment among the 1-page data stored in the data cache 25 to the memory controller 10 (S13).

The memory chip 21 transfers 1-page written data from the page j of the block Y to the page buffer 24 by a sense operation (S14). The execution period of Step S14 partially or entirely overlaps with the execution period of Step S13. After Steps S13 and S14, the memory chip 21 transfers the 1-page data from the page buffer 24 to the data cache 25 (S15). The memory chip 21 outputs a read-target data segment among 1-page data stored in the data cache 25 to the memory controller 10 (S16).

The memory chip 21 transfers 1-page written data from the page k of the block Z to the page buffer 24 by a sense operation (S17). The execution period of Step S17 partially or entirely overlaps with the execution period of Step S16.

Subsequently, the memory chip 21 may repeatedly perform processing similar to that in Steps S15 to S17.

In the second read operation, the memory controller 10 thus allows a period in which a read-target data segment written in one page is output from the data cache 25 and a period in which written data in another page is subjected to a sense operation to overlap with each other.

It may be likely that user data written in the sequential write pattern is to be read in the sequential read pattern. In such a case, the host read processor 102 identifies a page including a written data segment likely to be a next read target (second read target) following a current read-target data segment (first read target), based on the write management information 202. The host read processor 102 causes the memory chip 21 to perform the second read operation so as to perform a sense operation to the page including the identified second read target in the period in which the first read target is being output from the data cache 25.

Figure 11:
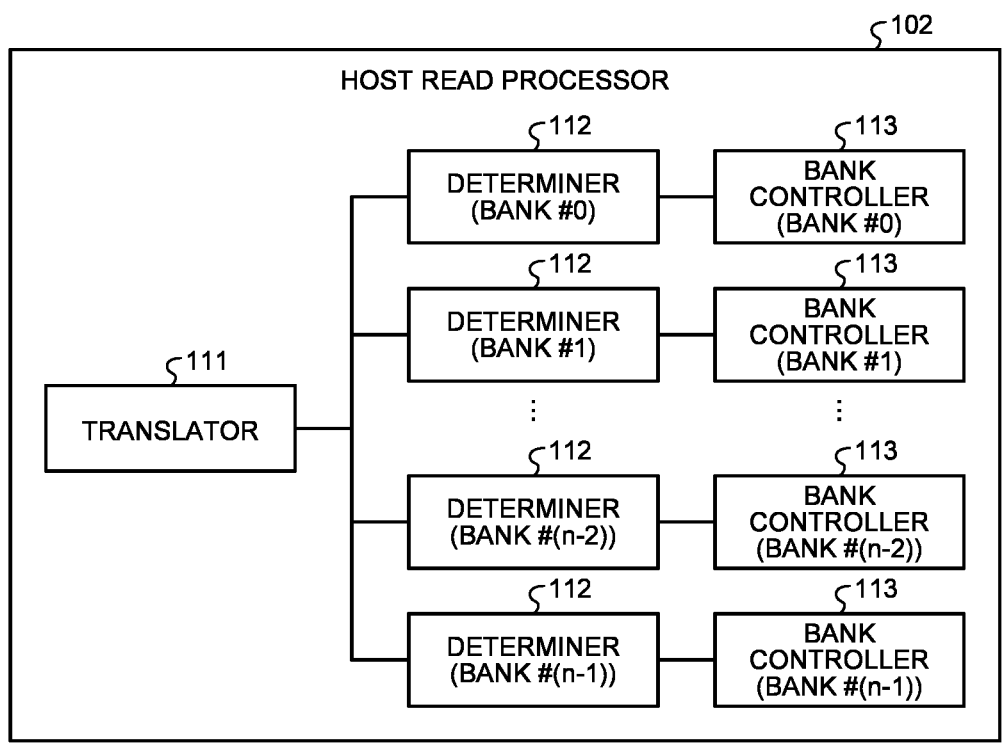
FIG. 11 is a schematic diagram illustrating an exemplary functional configuration of a host read processor according to the first embodiment.

FIG. 11 is a schematic diagram illustrating an exemplary functional configuration of the host read processor 102 of the first embodiment.

The host read processor 102 includes a translator 111, one or more determiners 112, and one or more bank controllers 113. A pair of the determiner 112 and the bank controller 113 is provided for each bank. In the example in FIG. 11, the memory system 1 includes n banks #0 to #(n−1). The host read processor 102 includes n pairs of the determiners 112 and the bank controllers 113 accordingly.

The translator 111 serves to identify a cluster to be read, specifically, a physical address indicating a cluster to be read, for each of one or more data segments requested from the host 2, based on the L2P information 201. The translator 111 inputs the physical address of each data segment to one of the n determiners 112 corresponding to the bank including the cluster to be read.

The determiner 112 receives the physical addresses and sequentially outputs them to the corresponding bank controller 113 for the same bank that it belongs to. The determiner 112 determines whether or not to perform a prefetch operation from a history of the physical addresses input from the translator 111. The determiner 112 then inputs a physical address and an instruction as to execution or non-execution of a prefetch operation to the bank controller 113.

The bank controller 113 causes the memory chip 21 of the corresponding bank of the NAND memory 20 to perform a read operation to the cluster designated by the input physical address. In response to input of a physical address and a non-prefetch instruction not to perform a prefetch operation, the bank controller 113 causes the memory chip 21 to perform the first read operation. In response to input of a physical address and a prefetch instruction to perform a prefetch operation, the bank controller 113 causes the memory chip 21 to perform the second read operation.

Figure 12:
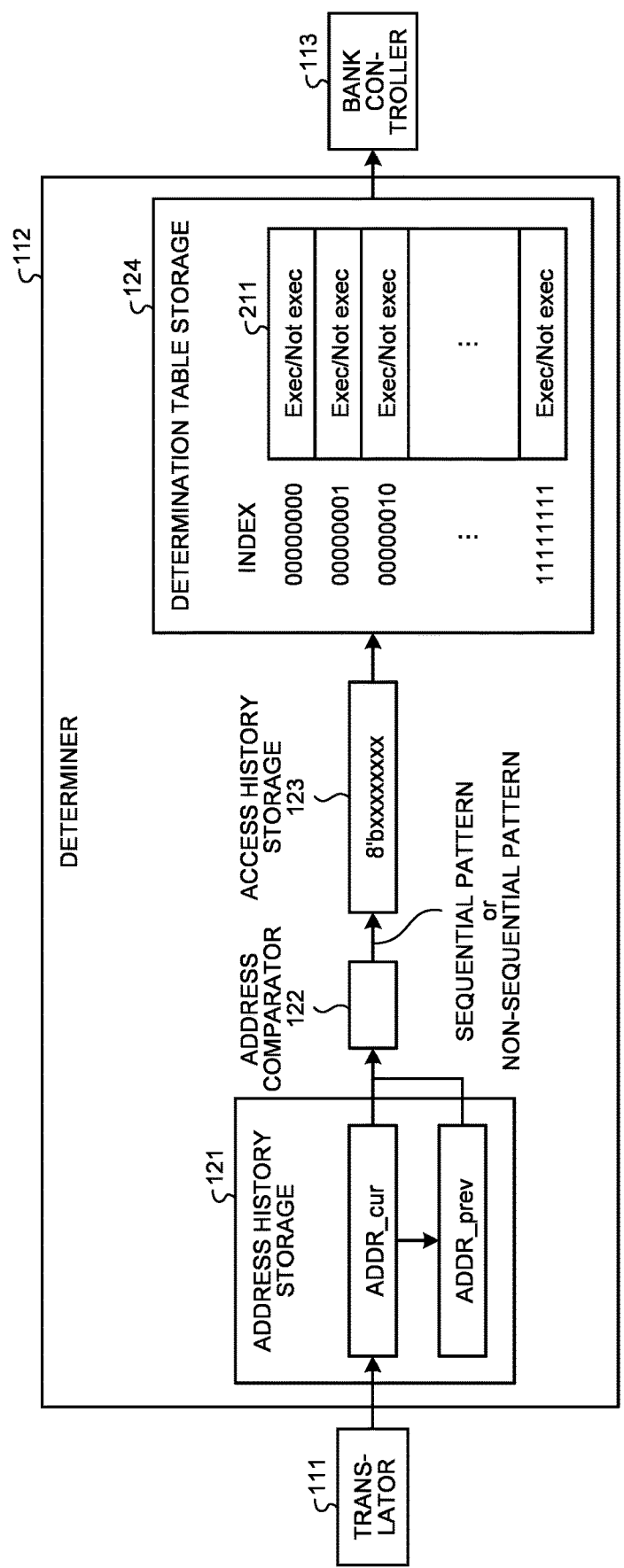
FIG. 12 is a schematic diagram illustrating an exemplary detailed functional configuration of a determiner according to the first embodiment.

FIG. 12 is a schematic diagram illustrating an exemplary detailed functional configuration of one determiner 112 according to the first embodiment. The host read processor 102 includes n determiners 112 having the same functional configuration.

The determiner 112 includes an address history storage 121, an address comparator 122, an access history storage 123, and a determination table storage 124.

The address history storage 121 stores a pair of recently input physical addresses including the most recently one. In the example in FIG. 12, the address history storage 121 stores the most recently input physical address ADDR_cur and a physical address ADDR_prev input immediately before the physical address ADDR_cur.

The address comparator 122 serves to determine whether read operations to a cluster designated by the physical address ADDR_prev and a cluster designated by the physical address ADDR_cur match the sequential pattern or the non-sequential pattern, from a perspective of the bank corresponding to the determiner 112. Specifically, the address comparator 122 determines whether or not the order of the physical address ADDR_prev and the physical address ADDR_cur matches a part of the order defined by the write management information 202, more specifically, the order defined by the write management information 202 excluding the order of writing user data to other banks and the order of writing metadata (hereinafter, referred to as user-data writing order). The address comparator 122 outputs a 1-bit value indicating the sequential pattern or the non-sequential pattern according to a result of the determination.

When the order of the physical address ADDR_prev and the physical address ADDR_cur matches a part of the user-data writing order, the address comparator 122 outputs a value indicating the sequential pattern as the determination result. When the order of the physical address ADDR_prev and the physical address ADDR_cur does not match any part of the user-data writing order, the address comparator 122 outputs a value indicating the non-sequential pattern as the determination result.

The access history storage 123 serves to store one or more results of the most recent determination made by the address comparator 122. The access history storage 123 includes, for example, an SRAM. The access history storage 123 may include a flip-flop. In the example in FIG. 12, the access history storage 123 is configured as an 8-bit register. Each time the address comparator 122 outputs a determination result, the determiner 112 performs a bit shift operation to shift the information stored in the access history storage 123 leftward by 1 bit. In this manner, the determiner 112 stores the most recent determination result output from the address comparator 122 at the rightmost end of the register. The access history storage 123 thus stores eight latest determination results. Hereinafter, 8-bit information stored in the access history storage 123 is referred to as an access history.

The determination table storage 124 serves to store a prefetch determination table 211. The determination table storage 124 includes, for example, an SRAM. The determination table storage 124 may include a flip-flop. The prefetch determination table 211 has the number of entries corresponding to the number of bits of the access history. The access history is defined as 8-bit data herein, so that the prefetch determination table 211 includes 28 entries. The 28 entries are individually assigned 8-bit indexes. Thereby, the prefetch determination table 211 allows a search using the access history as a search key. The prefetch determination table 211 pre-stores a 1-bit value indicating execution or non-execution of a prefetch operation in each of the entries. The determiner 112 refers to an entry with an index value the same as the access history. When the value referred to indicates execution (Exec), the determiner 112 determines to perform a prefetch operation. When the value referred to indicates non-execution (Not exec), the determiner 112 determines not to perform a prefetch operation.

A designer may determine the values stored in the entries of the prefetch determination table 211 by any method. As an example, the designer calculates, for each value of the access history, a probability that read operations based on two latest physical addresses including a physical address to be input next match the sequential pattern by experiment, simulation, or experience. The designer then sets numerical information to each entry according to the resultant probability. With a high probability that read operations based on the two latest physical addresses match the sequential pattern, the designer sets a value indicating execution of a prefetch operation. With a not high probability that the read operations based on the two latest physical addresses match the sequential pattern, the designer sets a value indicating non-execution of a prefetch operation.

For example, the designer sets a value indicating non-execution of a prefetch operation to an entry assigned an 8-bit access history (index) "00000010". The designer sets a value indicating execution of a prefetch operation to an entry assigned an 8-bit access history (index) "11111111". Herein, with regard to the determination results constituting the access history, value "1" indicates the sequential pattern and value "0" indicates the non-sequential pattern. The designer may also freely set the values indicating the sequential pattern and indicating the non-sequential pattern to "1" or "0" with respect to the determination results constituting the access history.

An exemplary operation of the memory system 1 of the first embodiment will be now described.

Figure 13:
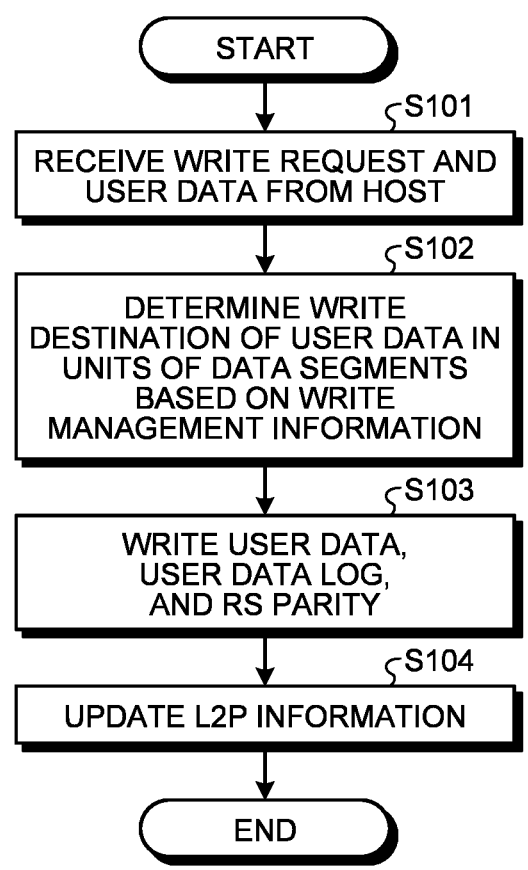
FIG. 13 is a flowchart illustrating an exemplary operation of a host write processor according to the first embodiment.

FIG. 13 is a flowchart illustrating an exemplary operation of the host write processor 101 according to the first embodiment. The following will describe an operation of the host write processor 101 in a situation that the memory controller 10 receives a write request and user data from the host 2. The host write processor 101 performs the operation in FIG. 13 upon receipt of a write request and user data.

The host write processor 101 receives a write request and user data from the host 2 (S101) and determines a write destination of the user data on a data segment basis with reference to the write management information 202 (S102).

As an example, the host write processor 101 determines the logical block number and the page number in the bit string of a physical address described with reference to FIG. 6. From a group of pages designated by the logical block number and the page number, the host write processor 101 determines a cluster as a write destination of one or more data segments of the user data in accordance with the write management information 202. For example, suppose that an "a-th" page includes an available cluster that is not designated as a write destination of any data segment. In this case, the host write processor 101 first determines the available cluster as a write destination of one data segment (referred to as first data segment). The host write processor 101 acquires the in-logical block location information assigned to the a-th page, and acquires the cluster number representing a relative location of the cluster being a write destination of the first data segment with reference to the head of the page.

The host write processor 101 determines the clusters included in the a-th page as write destinations of the data segments in the order of the cluster numbers until no available clusters remain in the a-th page. With no available clusters remaining in the a-th page, the host write processor 101 determines the clusters included in an (a+1)th page as write destinations of the data segments in the order of the cluster numbers. After determining, as write destinations of the user data, all the pages represented by the write management information 202 except for the regions 301 and 302 for metadata, the host write processor 101 increments the page number. In this manner the host write processor 101 determines write destinations of one or more data segments in the order from the zeroth page.

The host write processor 101 writes the user data to the NAND memory 20 on a page basis in accordance with the write management information 202 (S103). In Step S103, the host write processor 101 generates a user data log and RS parity at predetermined timing to write them to a logical block in accordance with the write management information 202.

The host write processor 101 then updates the L2P information 201 for each data segment of the user data written in Step S103 (S104), ending the operation.

Figure 14:
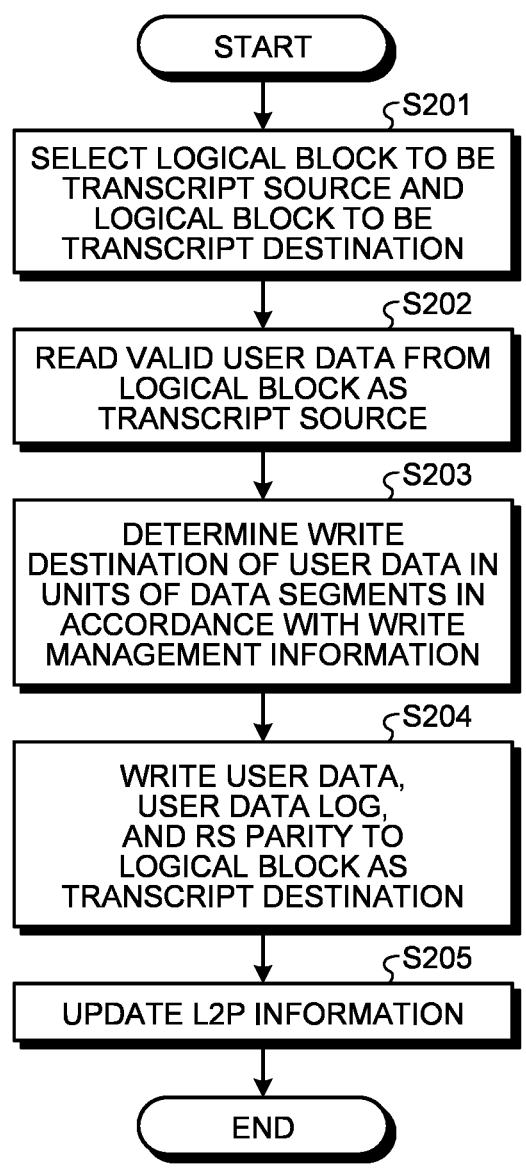
FIG. 14 is a flowchart illustrating an exemplary garbage collection performed by a GC processor according to the first embodiment.

FIG. 14 is a flowchart illustrating an exemplary garbage collection performed by the GC processor 103 according to the first embodiment. A garbage-collection start condition may be freely designed. As an example, the GC processor 103 performs a garbage collection when the number of free blocks in the memory system 1 falls below a predetermined number.

First, the GC processor 103 selects a logical block to be a transcript source and a logical block to be a transcript destination (S201). The GC processor 103 reads valid user data from the logical block being the transcript source (S202).

The GC processor 103 determines write destinations of the user data read from the logical block being the transcript source in units of data segments in accordance with the write management information 202 (S203). In Step S203, the GC processor 103 determines the write destinations by a method similar to that in Step S102.

The GC processor 103 writes the user data to the logical block being the transcript destination (S204). In Step S204, the GC processor 103 writes the user data, a user data log, and RS parity by a method similar to that in Step S103.

The GC processor 103 updates the L2P information 201 for each data segment of the user data written in Step S204 (S205), ending the operation.

Figure 15:
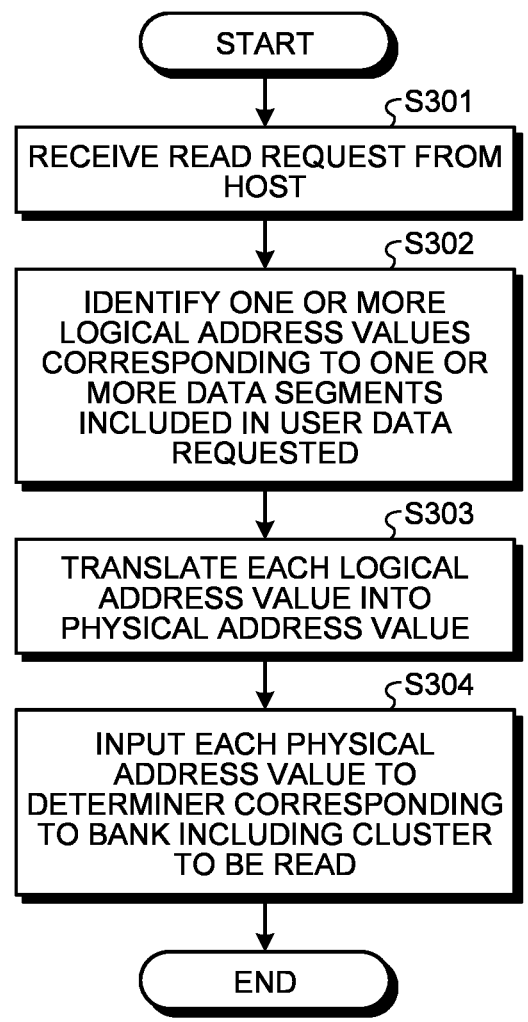
FIG. 15 is a flowchart illustrating an exemplary operation of a translator according to the first embodiment.

FIG. 15 is a flowchart illustrating an exemplary operation of the translator 111 according to the first embodiment. The following will describe an operation of the translator 111 in a situation that the memory controller 10 receives one read request from the host 2. The translator 111 performs the operation in FIG. 15 upon receipt of a read request.

In response to a receipt of a read request from the host 2 by the memory controller 10 (S301), the translator 111 in the host read processor 102 identifies one or more logical addresses for one or more data segments included in the requested user data, from a logical address range designated by the read request (S302).

The translator 111 translates the identified one or more logical addresses into one or more physical addresses based on the L2P information 201 (S303). This can identify one or more clusters containing the one or more written data segments of the user data.

The translator 111 inputs each physical address to the determiner 112 corresponding to a bank including the cluster to be read (S304). The translator 111 distributes the one or more physical addresses identified by the translation to one or more of the determiners 112 in the order of the identification. The translator 111 then ends the operation.

Figure 16:
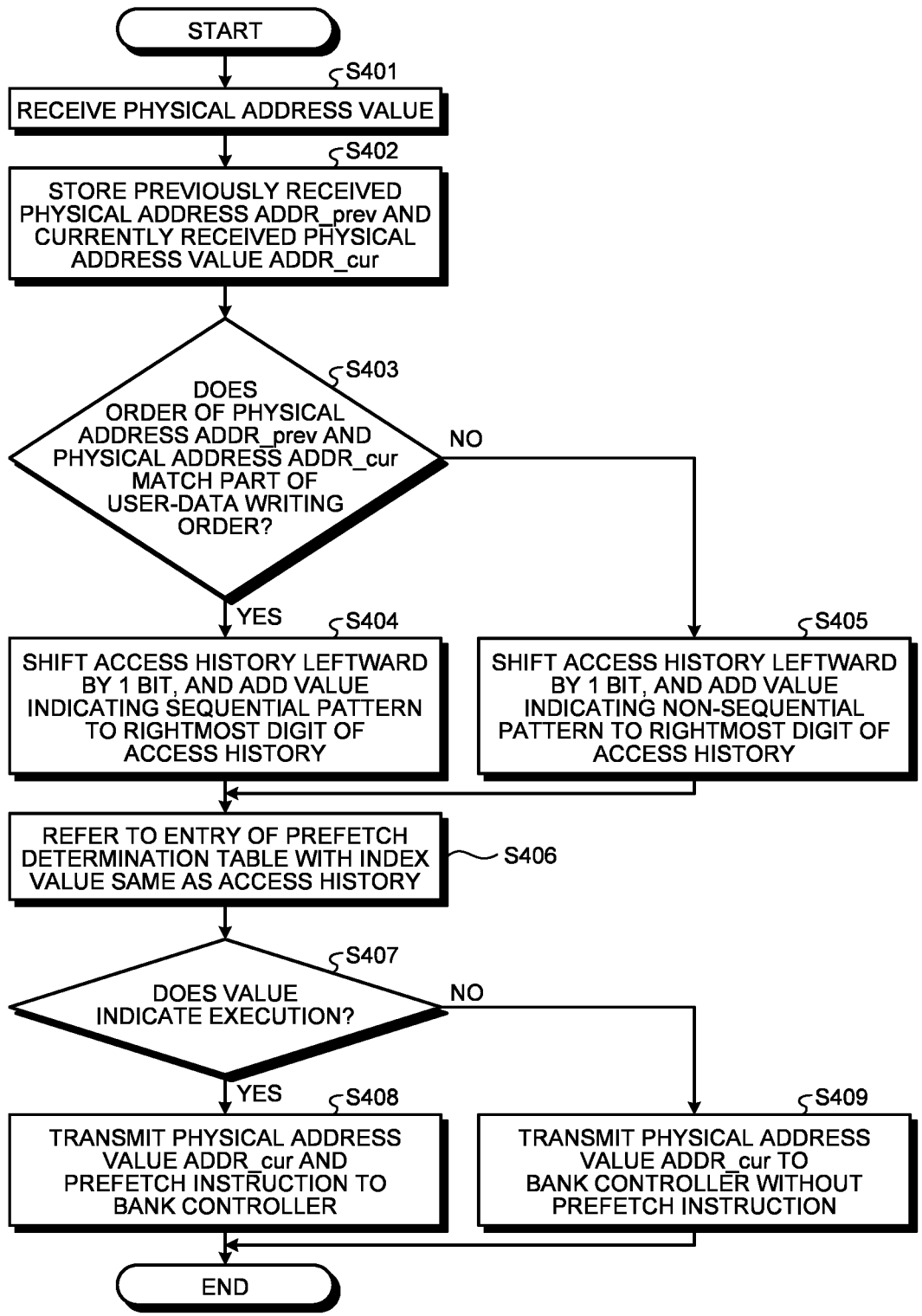
FIG. 16 is a flowchart illustrating an exemplary operation of the determiner according to the first embodiment.

FIG. 16 is a flowchart illustrating an exemplary operation of the determiner 112 according to the first embodiment. The determiner 112 receives physical addresses in sequence from the translator 111. FIG. 16 illustrates an operation of the determiner 112 when receiving a new physical address after receiving physical addresses multiple times. The determiner 112 performs a series of operations in FIG. 16 upon receipt of a physical address.

The determiner 112 receives a physical address from the translator 111 (S401), and then stores a previously received physical address ADDR_prev and a currently received physical address ADDR_cur in the address history storage 121 (S402).

The address comparator 122 determines whether or not the order of the physical address ADDR_prev and the physical address ADDR_cur matches a part of the user-data writing order, that is, the order defined in the write management information 202 excluding the order of writing user data to other banks and the order of writing metadata (S403).

According to the example in FIG. 8, with respect to the bank #31, for example, the user data is written to the lower page of the first physical block (i.e., number 87), the middle page of the first physical block (i.e., number 91), the lower page of the second physical block (i.e., number 183), the middle page of the second physical block (i.e., number 187), the lower page of the third physical block (i.e., number 279), and the middle page of the third physical block (i.e., number 283) in this order. In each of the pages, the order of the cluster numbers is defined as the writing order.

The address comparator 122 of the determiner 112 corresponding to the bank #31 determines whether or not the order of the physical address ADDR_prev and the physical address ADDR_cur matches a part of the above-described order. When the order of the physical address ADDR_prev and the physical address ADDR_cur matches the order of the middle page of the second physical block (i.e., number 187) and the lower page of the third physical block (i.e., number 279), for example, the address comparator 122 of the determiner 112 corresponding to the bank #31 determines that the order of the physical address ADDR_prev and the physical address ADDR_cur matches a part of the user-data writing order.

In response to a result of the determination being a match in Step S403 (S403: Yes), the determiner 112 shifts the access history stored in the access history storage 123 leftward by 1 bit, and adds a 1-bit value indicating the sequential pattern to the rightmost digit of the access history (S404).

In response to a result of the determination being a non-match (S403: No), the determiner 112 shifts the access history stored in the access history storage 123 leftward by 1 bit, and adds a 1-bit value indicating the non-sequential pattern to the rightmost digit of the access history (S405).

After Step S404 or S405, the determiner 112 refers to an entry in the prefetch determination table 211 with an index value same as the access history (S406). The determiner 112 determines whether or not the value referred to indicates execution (S407).

When the value indicates execution (S407: Yes), the determiner 112 transmits the physical address ADDR_cur and a prefetch instruction to the bank controller 113 (S408).

When the value indicates non-execution (S408: No), the determiner 112 transmits the physical address ADDR_cur to the bank controller 113 without a prefetch instruction (S409).

After Step S408 or S409, the determiner 112 ends the operation.

Figure 17:
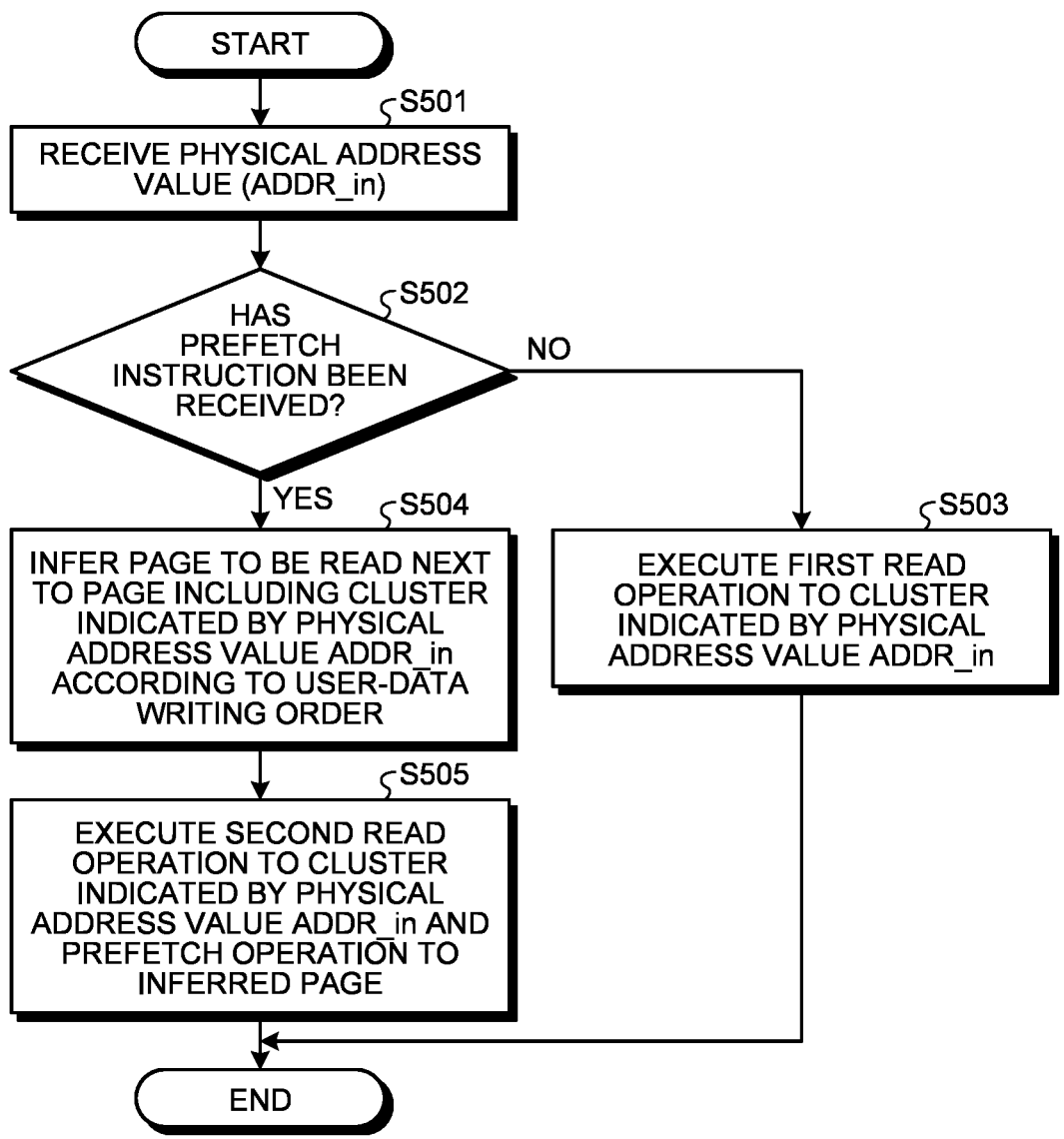
FIG. 17 is a flowchart illustrating an exemplary operation of a bank controller according to the first embodiment.

FIG. 17 is a flowchart illustrating an exemplary operation of the bank controller 113 according to the first embodiment. The bank controller 113 receives physical addresses in sequence from the determiner 112. FIG. 17 illustrates an operation of the bank controller 113 when receiving one physical address. The bank controller 113 performs a series of operations of FIG. 17 upon receipt of a physical address.

The bank controller 113 receives a physical address from the determiner 112 (S501) and then determines whether or not to have received a prefetch instruction together with the physical address (S502). In connection with FIG. 17, the newly input physical address in Step S501 is denoted by ADDR_in.

Having received the physical address ADDR_in with no prefetch instruction (S502: No), the bank controller 113 performs the first read operation to a cluster designated by the physical address ADDR_in (S503). The host read processor 102 transfers a data segment output from the NAND memory 20 in Step S503 to the host 2.

Having received both a prefetch instruction and the physical address ADDR_in (S502: Yes), the bank controller 113 infers a page to be read next to the page including the cluster designated by the physical address ADDR_in according to the user-data writing order, that is, the order defined in the write management information 202 excluding the order of writing user data to other banks and the order of writing metadata (S504).

According to the example in FIG. 8, with respect to the bank #31, for example, the user data is written to the lower page of the first physical block (i.e., number 87), the middle page of the first physical block (i.e., number 91), the lower page of the second physical block (i.e., number 183), the middle page of the second physical block (i.e., number 187), the lower page of the third physical block (i.e., number 279), and the middle page of the third physical block (i.e., number 283) in this order. As an example, in a case that the middle page of the first physical block (i.e., number 91) includes the cluster designated by the physical address ADDR_in, the bank controller 113 infers the lower page of the second physical block (i.e., number 183) subsequent to the middle page of the first physical block in the order, as a page to be read next.

The bank controller 113 performs the second read operation, i.e., a read operation to the cluster designated by the physical address ADDR_in and a prefetch operation to the inferred page (S505). The host read processor 102 transfers a data segment output from the NAND memory 20 in Step S505 to the host 2.

After Step S503 or S505, the bank controller 113 ends the operation.

According to the first embodiment as described above, the memory controller 10 writes a plurality of data segments of user data or metadata to the NAND memory 20 based on the write management information 202 that defines the order of selection of write destinations and write destinations of the user data and the metadata (e.g., see FIG. 13). In response to a read request from the host 2, the memory controller 10 sequentially identifies a plurality of clusters containing a plurality of written data segments corresponding to user data requested by the read request (e.g., see S301 to S303 in FIG. 15). The memory controller 10 then determines whether or not to perform a prefetch operation in a read operation to the NAND memory 20 according to the order in which the clusters including written data segments have been identified and the order defined by the write management information 202 excluding the order of writing metadata (e.g., see FIG. 16).

Consequently, the memory controller 10 can accurately determine whether or not the data segments of the user data are being read from the NAND memory 20 in the same order as the order in which the data segments have been written to the NAND memory 20. The memory controller 10 can determine whether or not to perform a prefetch operation based on a result of such an accurate determination as to whether the data segments of the user data are being read from the NAND memory 20 in the same order as the order in which the data segments have been written to the NAND memory 20. Thereby, the memory controller 10 can enhance an effect of a prefetch operation to improve the read performance. The memory system 1 can be thus improved in read performance.

When determining not to perform a prefetch operation, the memory controller 10 causes the NAND memory 20 to perform a first read operation. When determining to perform a prefetch operation, the memory controller 10 causes the NAND memory 20 to perform a second read operation. The first read operation refers to an operation of transferring data from the memory cell array 22 to the page buffer 24, transferring the data from the page buffer 24 to the data cache 25, and outputting the data from the data cache 25 to the memory controller 10. The second read operation refers to an operation of transferring data from the memory cell array 22 to the page buffer 24, transferring the data from the page buffer 24 to the data cache 25, outputting the data from the data cache 25 to the memory controller 10, and transferring another data from the memory cell array 22 to the page buffer 24 in a period overlapping with a period in which the data is being output from the data cache 25 to the memory controller 10.

In the first embodiment, the memory controller 10 acquires a pair of clusters most recently, consecutively identified among identified clusters to be read each time a cluster to be read is identified. The memory controller 10 determines whether or not to perform a prefetch operation based on a result of the determination on whether or not the order of the cluster pair is included in the order defined by the write management information 202 excluding the order of writing metadata (e.g., see FIG. 16).

In the first embodiment, the memory controller 10 includes the access history storage 123 that stores an access history. The access history is a history of results of determination as to whether or not the order of read operations of two consecutively identified clusters is included in the user-data writing order. The memory controller 10 determines whether or not to perform a prefetch operation from the access history.

Thus, the memory controller 10 can perform a complex prefetch control. As an example, the memory controller 10 performs prefetch control over the NAND memory 20 to perform a prefetch operation, in the event that the order of read operations of two consecutively identified clusters is consecutively found in the user-data writing order a predetermined number of times.

Note that the memory controller 10 may not use the access history to determine whether or not to perform a prefetch operation. For example, the memory controller 10 may determine to perform a prefetch operation when the order of read operations of two consecutively identified clusters is included in the user-data writing order. The memory controller 10 may determine not to perform a prefetch operation when the order of read operations of two consecutively identified clusters is not included in the user-data writing order.

In the first embodiment, the memory controller 10 further includes the determination table storage 124 that stores the prefetch determination table 211. The prefetch determination table 211 includes a plurality of entries. The entries store respective values indicating whether or not to perform a prefetch operation. The entries are individually assigned indexes. The memory controller 10 determines whether or not to perform a prefetch operation according to the value stored in one of the entries in the prefetch determination table 211 with an index value same as the access history.

Thus, the memory controller 10 can perform a complex prefetch control based on the access history.

Second Embodiment

In a garbage collection, valid user data alone is relocated from one logical block to another logical block. Because of this, even if data segments have been written in the sequential write pattern from the host 2 and written to the NAND memory 20 in the order defined by the write management information 202, the garbage collection may cause a change in data segment arrangement from the one at the time of processing responsive to a write request.

In a second embodiment, the values in the entries of the prefetch determination table are sequentially updated by learning so as to allow the memory controller 10 to make a proper determination as to whether or not to perform a prefetch operation in accordance with the access history, in the event of a change in data segment arrangement from the one at the time of processing responsive to a write request due to the garbage collection.

The memory system 1 of the second embodiment will be described below. The second embodiment will omit describing or briefly describe the same features (elements, functions, or operations) as those in the first embodiment.

The host read processor 102 of the second embodiment includes determiners 112a instead of the determiners 112 of the first embodiment. The host read processor 102 includes the determiners 112a for the respective banks.

Figure 18:
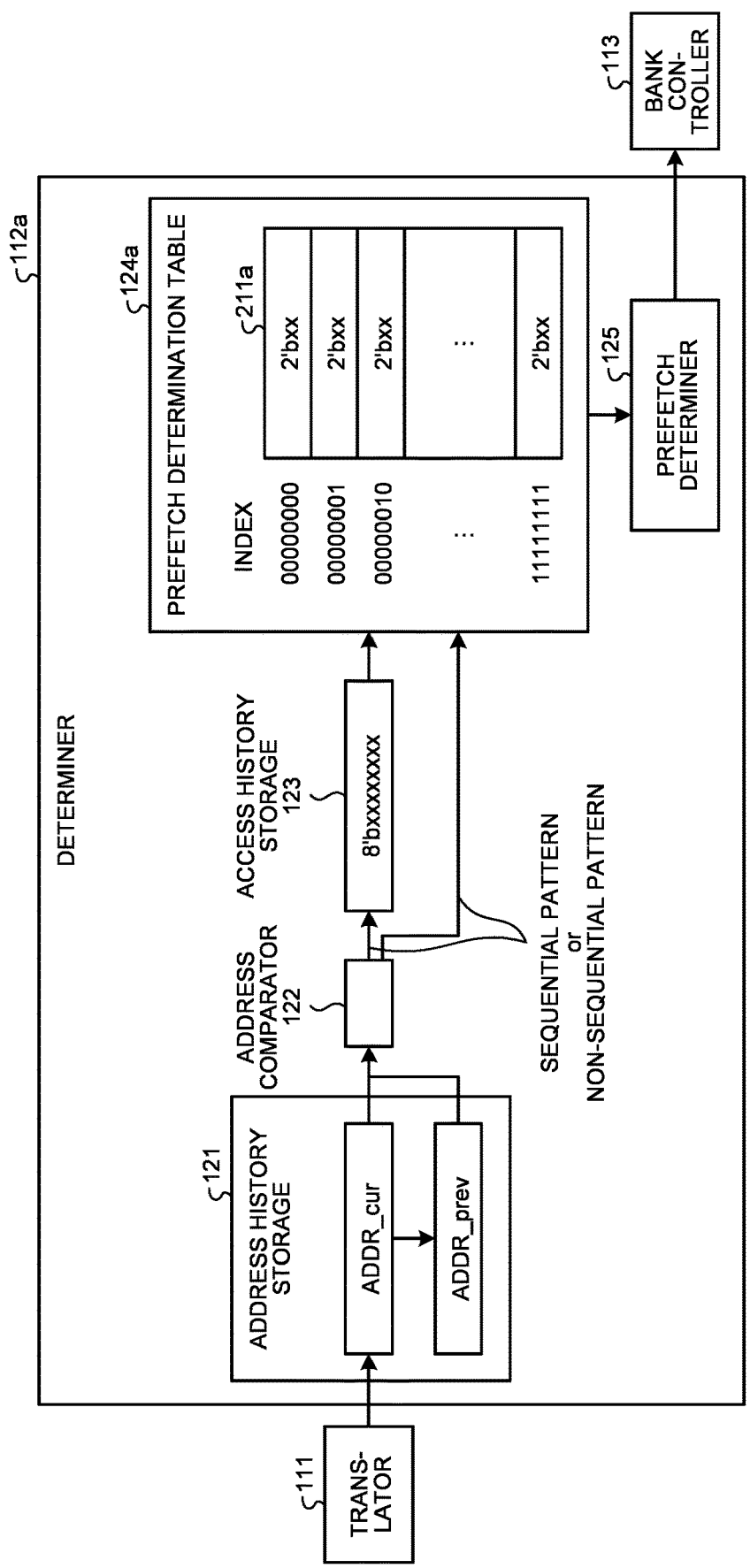
FIG. 18 is a schematic diagram illustrating an exemplary detailed functional configuration of a determiner according to a second embodiment.

FIG. 18 is a schematic diagram illustrating an exemplary detailed functional configuration of one determiner 112a according to the second embodiment. The determiners 112a of the host read processor 102 have the same functional configuration.

The determiner 112a includes the address history storage 121, the address comparator 122, the access history storage 123, a determination table storage 124a, and the prefetch determiner 125.

The determination table storage 124a stores a prefetch determination table 211a. As with the prefetch determination table 211 of the first embodiment, the prefetch determination table 211a includes a plurality of entries (28 entries in this embodiment as an example) that allow a search using an access history as a search key. The entries individually store 1-bit or more values serving as a saturation counter. As an example, the saturation counter values stored in each entry are defined as 2-bit values.

Figure 19:
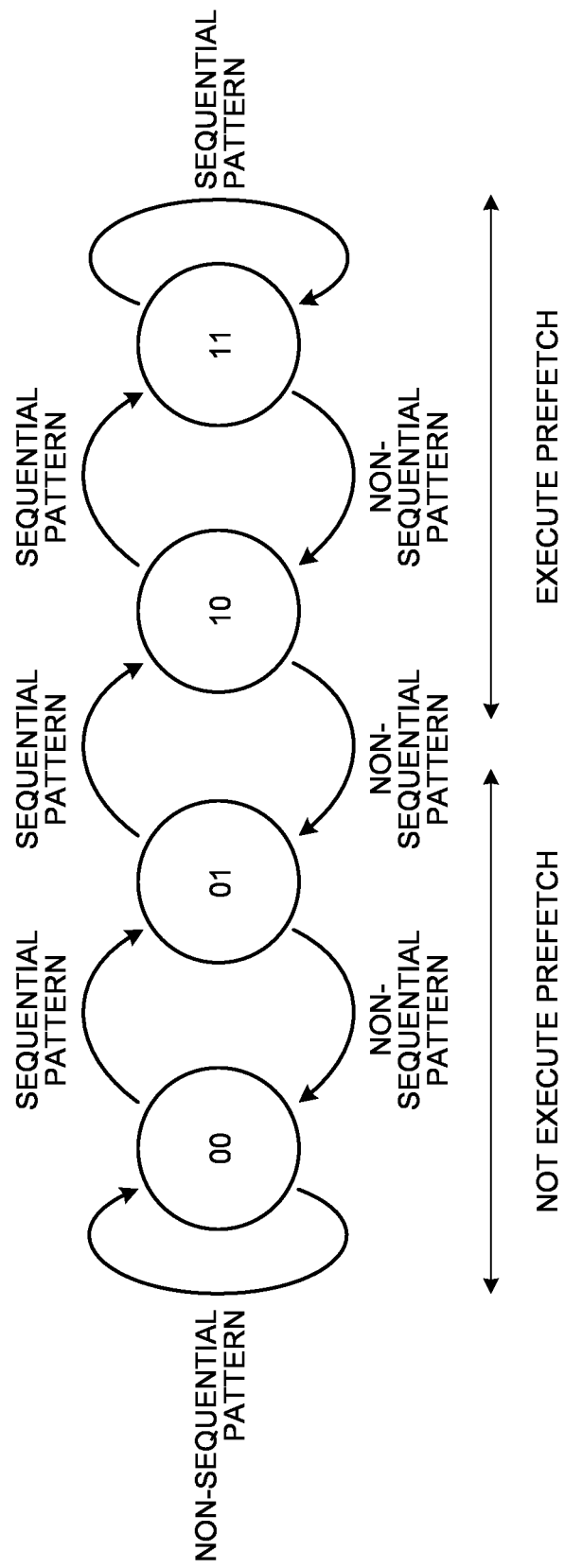
FIG. 19 is a schematic diagram illustrating a transition of a saturation counter value recorded in each entry of a prefetch determination table according to the second embodiment by way of example.

FIG. 19 is a schematic diagram illustrating an example of transition of a saturation counter value recorded in each entry of the prefetch determination table 211a according to the second embodiment.

The saturation counter can take four values "00", "01", "10", and "11" in each entry. A saturation counter value is obtained by referring to the prefetch determination table 211a and is input to the prefetch determiner 125. The prefetch determiner 125 compares the saturation counter value and a threshold to determine whether or not to perform a prefetch operation.

In the example in FIG. 19, at the saturation counter value being "01" or less, that is, "00" or "01", the prefetch determiner 125 determines not to perform a prefetch operation. At the saturation counter value exceeding "01", that is, "10" or "11", the prefetch determiner 125 determines to perform a prefetch operation.

Thus, the saturation counter values in the entries of the prefetch determination table 211 can be regarded as probability information representing a probability that read operations based on two most recent physical addresses including a physical address to be input next correspond to a sequential pattern.

In response to an input of a new physical address from the translator 111, the determiner 112a updates the saturation counter value in the entry referred to at the time of a previous physical address input, according to a result of determination by the address comparator 122 responsive to the new physical address input.

Specifically, when the output value of the address comparator 122 indicates the sequential pattern, the determiner 112a adds "1" to the saturation counter value. When the output value of the address comparator 122 indicates the non-sequential pattern, the determiner 112a subtracts "1" from the saturation counter value.

For example, when the output value of the address comparator 122 indicates the sequential pattern while an access history (index) stored in the access history storage 123 indicates an 8-bit value "00000010", the determiner 112a adds "1" to the saturation counter in the entry storing the index concerned. When the output value of the address comparator 122 indicates the non-sequential pattern while the access history (index) stored in the access history storage 123 indicates an 8-bit value "11111111", the determiner 112a subtracts "1" from the saturation counter in the entry with the index concerned.

When attempting to add "1" to the saturation counter value being "11", the determiner 112a maintains the saturation counter value at "11". When attempting to subtract "1" from the saturation counter value "00", the determiner 112a maintains the saturation counter value at "00".

In this manner, it is possible to update the probability information managed by the prefetch determination table 211a depending on the fact that read operations based on a consecutively input physical address pair matches or does not match the sequential pattern. Even if a change occurs in the data segment arrangement due to the garbage collection, it is thus possible to update the probability information so as to allow a proper determination as to whether or not to perform a prefetch operation according to the access history, through a several read operations to the data segment arrangement after the change.

Figure 20:
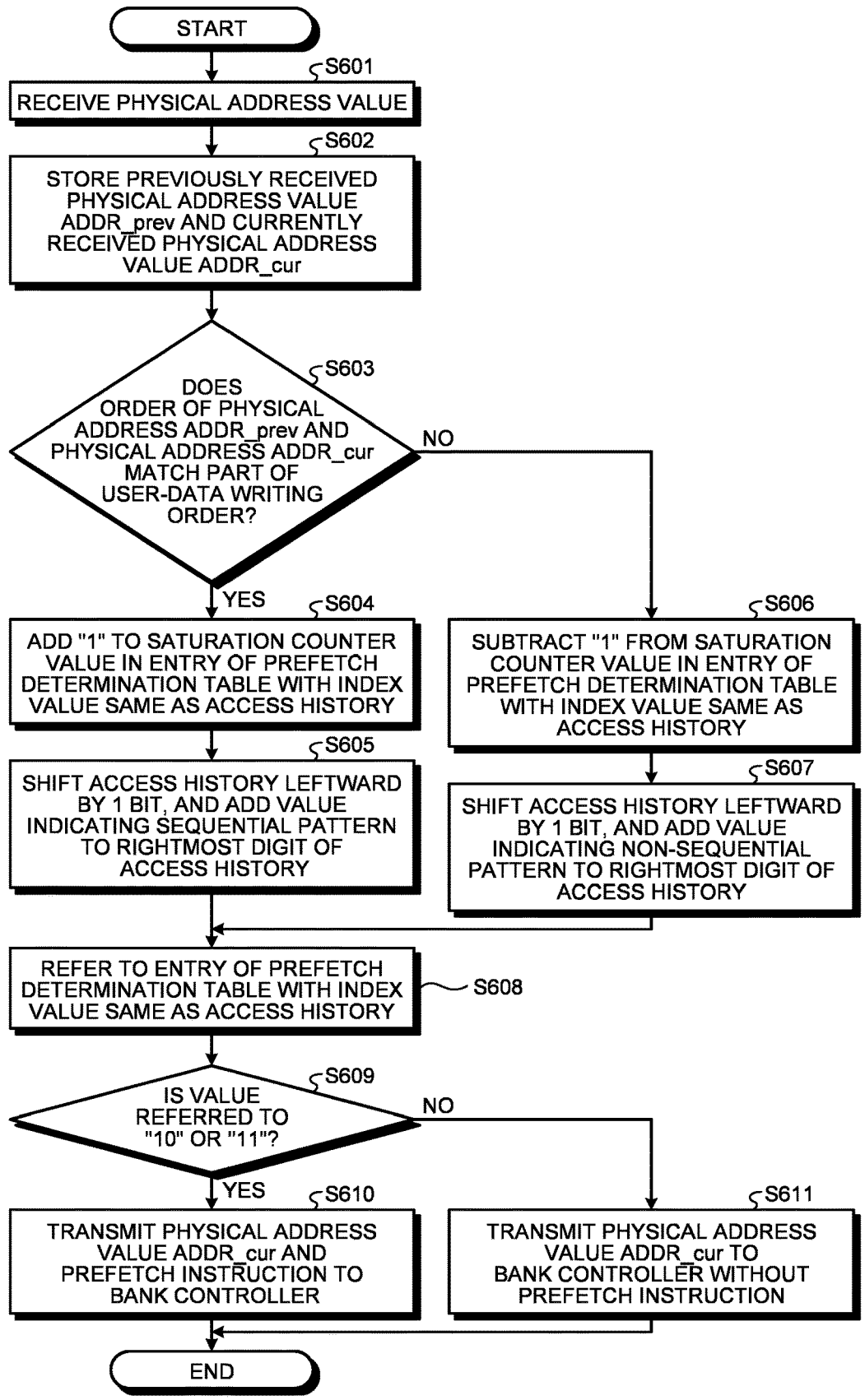
FIG. 20 is a flowchart illustrating an exemplary operation of the determiner according to the second embodiment.

FIG. 20 is a flowchart illustrating an exemplary operation of the determiner 112a of the second embodiment. The determiner 112a receives physical addresses sequentially from the translator 111. FIG. 20 illustrates an operation of the determiner 112a when receiving a new physical address after receiving two or more physical addresses. The determiner 112a performs a series of operations of FIG. 20 upon receipt of a physical address.

In Steps S601 to S603, the determiner 112a performs processing similar to that in Steps S401 to S403 of FIG. 16.

When the determination in Step S603 results in a match (S603: Yes), the determiner 112a adds "1" to the saturation counter value in an entry of the prefetch determination table 211a with an index value same as an access history (S604).

In Step S604, the determiner 112a updates the saturation counter value in an entry of the prefetch determination table 211a depending on the fact that read operations to the cluster designated by the physical address ADDR_prev and the cluster designated by the physical address ADDR_cur correspond to the sequential pattern. The entry concerned is the one referred to at the time of determining whether or not to perform a prefetch operation in response to a previous physical address input.

After Step S604, the determiner 112a shifts the access history stored in the access history storage 123 leftward by 1 bit, and adds a 1-bit value indicating the sequential pattern to the rightmost digit of the access history (S605).

When the determination in Step S603 results in a non-match (S603: No), the determiner 112a subtract "1" from the saturation counter value in an entry of the prefetch determination table 211a with an index value same as the access history (S606).

In Step S606, the determiner 112a updates the saturation counter value in an entry of the prefetch determination table 211a depending on the fact that read operations to the cluster designated by the physical address ADDR_prev- and the cluster designated by the physical address ADDR_cur correspond to the non-sequential pattern. The entry concerned is the one referred to at the time of determining whether or not to perform a prefetch operation in response to a previous physical address input.

After Step S606, the determiner 112a shifts the access history stored in the access history storage 123 leftward by 1 bit, and adds a 1-bit value indicating the non-sequential pattern to the rightmost digit of the access history (S607).

After Step S605 or S607, the determiner 112a refers to an entry of the prefetch determination table 211a with an index value same as the access history (S608). The determiner 112 determines whether or not the value referred to is "10" or "11" (S609).

When the value referred to is "10" or "11" (S609: Yes), the determiner 112a transmits the physical address ADDR_cur and a prefetch instruction to the bank controller 113 (S610).

When the value referred to is "00" or "01" (S609: No), the determiner 112 transmits the physical address ADDR_cur to the bank controller 113 without a prefetch instruction (S611).

After Step S610 or S611, the determiner 112a ends the operation.

According to the second embodiment as described above, the memory controller 10 determines whether or not the order of read operations of two consecutively identified clusters is included in the order defined by the write management information 202 excluding the order of writing metadata. After the determination, the memory controller 10 updates a saturation counter value in one of the entries of the prefetch determination table 211a with an index same as the access history according to a result of the determination (e.g., see S604 or S606 in FIG. 20). After updating the saturation counter value, the memory controller 10 updates the access history according to the determination result (e.g., see S605 or S607 in FIG. 20). After updating the access history, the memory controller 10 determines whether or not to perform a prefetch operation from the saturation counter value in one of the entries of the prefetch determination table 211a with an index same as the access history (e.g., see S608 to S611 in FIG. 20).

As such, the memory controller 10 can properly make a determination as to whether or not to perform a prefetch operation in accordance with the access history, irrespective of a change in the data segment arrangement due to the garbage collection.

While certain embodiments have been described, these embodiments have been presented by way of example only, and are not intended to limit the scope of the inventions. Indeed, the novel methods and systems described herein may be embodied in different other forms; furthermore, various omissions, substitutions and varies in the form of the methods and systems described herein may be made without departing from the spirit of the inventions. The accompanying claims and their equivalents are intended to cover such forms or modifications as would fall within the scope and spirit of the inventions.

What is claimed is:

1. A memory system to be connected to a host, the memory system comprising:
    a first memory that includes a nonvolatile storage region including a plurality of first segment regions; and
    a memory controller configured to:
        write a plurality of first data segments of user data and metadata to the plurality of first segment regions in accordance with a first setting, the first setting being a setting that defines a first order and write destinations of the user data and the metadata in the plurality of first segment regions, the first order being an order of selection of the plurality of first segment regions as a write destination,
        in response to a read request from the host, individually identify a plurality of second segment regions to which a plurality of second data segments has been written, from among the plurality of first segment regions, the plurality of second data segments corresponding to user data requested by the read request among the plurality of first data segments, and determine whether or not to perform a prefetch operation in a read operation to the plurality of second segment regions according to a second order and a third order, the second order being an order of reading the plurality of second data segments from the plurality of second segment regions, the third order corresponding to the first order excluding the order of write destinations of the metadata.

2. The memory system according to claim 1, wherein the first memory includes a first buffer and a second buffer, the first memory is configured to perform:
a first read operation including transferring first data from the nonvolatile storage region to the first buffer, transferring the first data from the first buffer to the second buffer, and transferring the first data from the second buffer to the memory controller, and
a second read operation including transferring second data from the nonvolatile storage region to the first buffer, transferring the second data from the first buffer to the second buffer, transferring the second data from the second buffer to the memory controller, and transferring third data from the nonvolatile storage region to the first buffer in a period overlapping with a period in which the second data is transferred from the second buffer to the memory controller, and the memory controller is further configured to cause the first memory to:
perform the first read operation upon determining not to perform the prefetch operation, and
perform the second read operation upon determining to perform the prefetch operation.

3. The memory system according to claim 1, wherein the memory controller is configured to determine the second order according to physical addresses of the plurality of second segment regions.

4. The memory system according to claim 1, wherein the memory controller is configured to:
each time the second order is identified, acquire a pair of second segment regions from which the second data segments have been consecutively read most recently among the plurality of second segment regions, and
determine whether or not to perform the prefetch operation based on a result of determination as to whether or not the third order includes a fourth order, the fourth order being an order of reading the plurality of second data segments from the pair of second segment regions.

5. The memory system according to claim 4, wherein the memory controller includes a second memory configured to store a history of results of first determinations as to whether or not the third order includes the fourth order, and the memory controller is configured to determine whether or not to perform the prefetch operation according to the history stored in the second memory.

6. The memory system according to claim 5, wherein the memory controller further includes a third memory configured to store a table including a plurality of entries with index values, each of the entries storing a value indicating whether or not to perform the prefetch operation, and the memory controller is configured to determine whether or not to perform the prefetch operation from the value stored in an entry with an index value same as the history among the plurality of entries.

7. The memory system according to claim 6, wherein the memory controller is further configured to:
update the value stored in a first entry with an index value same as the history among the plurality of entries based on a result of one of the first determinations, after determining whether or not the third order includes the fourth order,
update the history based on the result of the one of the first determinations after updating the value stored in the first entry, and
after updating the history, determine whether or not to perform the prefetch operation based on the value stored in a second entry with an index value same as the updated history among the plurality of entries.

8. The memory system according to claim 7, wherein the value stored in each of the plurality of entries is a saturation counter value, and
the memory controller is further configured to perform addition or subtraction with respect to the saturation counter value in the first entry based on the result of the one of the first determinations, and determine whether or not to perform the prefetch operation from a result of comparison between the saturation counter value in the second entry and a threshold.

9. The memory system according to claim 8, wherein the memory controller is configured to:
perform the addition with respect to the saturation counter value in the first entry when the result of the one of the first determinations indicates that the third order includes the fourth order, and
perform the subtraction with respect to the saturation counter value in the first entry when the result of the one of the first determinations indicates that the third order does not include the fourth order.

10. The memory system according to claim 9, wherein the memory controller is configured to:
determine to perform the prefetch operation when the saturation counter value in the second entry is greater than the threshold, and
determine not to perform the prefetch operation when the saturation counter value in the second entry is less than the threshold.

11. A method of controlling a first memory, the first memory including a nonvolatile storage region that includes a plurality of first segment regions, the method comprising:
writing a plurality of first data segments of user data and metadata to the plurality of first segment regions in accordance with a first setting, the first setting being a setting that defines a first order and write destinations of the user data and the metadata in the plurality of first segment regions, the first order being an order of selection of the plurality of first segment regions as a write destination;
in response to a read request from a host, individually identifying a plurality of second segment regions to which a plurality of second data segments has been written, from among the plurality of first segment regions, the plurality of second data segments corresponding to user data requested by the read request among the plurality of first data segments; and
determining whether or not to perform a prefetch operation in a read operation to the plurality of second segment regions according to a second order and a third order, the second order being an order of reading the plurality of second data segments from the plurality of second segment regions, the third order corresponding to the first order excluding the order of write destinations of the metadata.

12. The method according to claim 11, wherein
the first memory includes a first buffer and a second buffer,
the first memory is configured to perform:
  a first read operation including transferring first data from the nonvolatile storage region to the first buffer, transferring the first data from the first buffer to the second buffer, and transferring the first data from the second buffer to a memory controller, and
  a second read operation including transferring second data from the nonvolatile storage region to the first buffer, transferring the second data from the first buffer to the second buffer, transferring the second data from the second buffer to the memory controller, and transferring third data from the nonvolatile storage region to the first buffer in a period overlapping with a period in which the second data is transferred from the second buffer to the memory controller,
the method further comprises:
causing the first memory to perform the first read operation upon determining not to perform the prefetch operation; and
causing the first memory to perform the second read operation upon determining to perform the prefetch operation.

13. The method according to claim 11, further comprising determining the second order according to physical addresses of the plurality of second segment regions.

14. The method according to claim 11, further comprising:
  acquiring a pair of second segment regions from which the second data segments have been consecutively read most recently among the plurality of second segment regions, each time the second order is identified; and
  determining whether or not to perform the prefetch operation based on a result of determination as to whether or not the third order includes a fourth order, the fourth order being an order of reading the plurality of second data segments from the pair of second segment regions.

15. The method according to claim 14, further comprising storing, in a second memory, a history of results of first determinations as to whether or not the third order includes the fourth order, wherein
the determining whether or not to perform the prefetch operation comprises determining whether or not to perform the prefetch operation according to the history stored in the second memory.

16. The method according to claim 15, further comprising storing, in a third memory, a table including a plurality of entries with index values, each of the entries storing a value indicating whether or not to perform the prefetch operation, wherein
the determining whether or not to perform the prefetch operation comprises determining whether or not to perform the prefetch operation from the value stored in an entry with an index value same as the history among the plurality of entries.

17. The method according to claim 16, further comprising:
  updating the value stored in a first entry with an index value same as the history among the plurality of entries based on a result of one of the first determinations, after determining whether or not the third order includes the fourth order;
  updating the history based on the result of the one of the first determinations after updating the value stored in the first entry; and
  after updating the history, determining whether or not to perform the prefetch operation based on the value stored in a second entry with an index value same as the updated history among the plurality of entries.

18. The method according to claim 17, wherein
the value stored in each of the plurality of entries is a saturation counter value, the method further comprises:
performing addition or subtraction with respect to the saturation counter value in the first entry based on the result of the one of the first determinations; and
determining whether or not to perform the prefetch operation from a result of comparison between the saturation counter value in the second entry and a threshold.

19. The method according to claim 18, wherein
the performing addition or subtraction comprises:
performing the addition with respect to the saturation counter value in the first entry when the result of the one of the first determinations indicates that the third order includes the fourth order, and
performing the subtraction with respect to the saturation counter value in the first entry when the result of the one of the first determinations indicates that the third order does not include the fourth order.

20. The method according to claim 19, wherein
the determining whether or not to perform the prefetch operation comprises:
determining to perform the prefetch operation when the saturation counter value in the second entry is greater than the threshold, and
determining not to perform the prefetch operation when the saturation counter value in the second entry is less than the threshold.

* * * * *